(12) United States Patent
Kajihara

(10) Patent No.: US 11,977,775 B2
(45) Date of Patent: May 7, 2024

(54) MEMORY SYSTEM

(71) Applicant: Kioxia Corporation, Tokyo (JP)

(72) Inventor: Hirotsugu Kajihara, Yokohama (JP)

(73) Assignee: Kioxia Corporation, Tokyo (JP)

( * ) Notice: Subject to any disclaimer, the term of this patent is extended or adjusted under 35 U.S.C. 154(b) by 122 days.

(21) Appl. No.: 17/653,035

(22) Filed: Mar. 1, 2022

(65) Prior Publication Data

US 2023/0090008 A1 Mar. 23, 2023

(30) Foreign Application Priority Data

Sep. 15, 2021 (JP) .................. 2021-150445

(51) Int. Cl.
*G06F 3/06* (2006.01)
*G06F 11/10* (2006.01)

(52) U.S. Cl.
CPC .......... *G06F 3/0659* (2013.01); *G06F 3/0613* (2013.01); *G06F 3/0619* (2013.01); *G06F 3/0634* (2013.01); *G06F 3/0635* (2013.01); *G06F 3/0679* (2013.01); *G06F 11/1068* (2013.01)

(58) Field of Classification Search
CPC .... G06F 3/0659; G06F 3/0613; G06F 3/0619; G06F 3/0634; G06F 3/0635; G06F 3/0679; G06F 11/1068
See application file for complete search history.

(56) References Cited

U.S. PATENT DOCUMENTS

| | | | |
|---|---|---|---|
| 8,397,127 B2 | 3/2013 | Otsuka | |
| 9,021,336 B1 | 4/2015 | Northcott | |
| 10,528,464 B2* | 1/2020 | Ishiyama | ............... G06F 3/064 |
| 2019/0205244 A1* | 7/2019 | Smith | ................. G06F 3/065 |
| 2022/0405168 A1* | 12/2022 | Sakai | ................ G06F 11/1068 |

FOREIGN PATENT DOCUMENTS

| | | |
|---|---|---|
| JP | 2011-134031 A | 7/2011 |
| JP | 5789767 B2 | 10/2015 |
| JP | 2018-73312 A | 5/2018 |

* cited by examiner

*Primary Examiner* — Eric Cardwell
(74) *Attorney, Agent, or Firm* — Oblon, McClelland, Maier & Neustadt, L.L.P.

(57) ABSTRACT

According to one embodiment, a memory system includes: a plurality of memory chips; a plurality of memory controllers; and a data encoding circuit configured to form a first group including a continuous plurality of first divided data among the user data, and generate a plurality of first page data. The memory controllers adjust a schedule of a write operation among the memory controllers and control a number of the write operations to be simultaneously executed. When at least one of the memory chips is in a busy state in a first read request, the memory controller connected to the memory chip in the busy state decodes the first divided data through erasure correction decoding processing using the first divided data read from the memory chip not in the busy state.

19 Claims, 27 Drawing Sheets

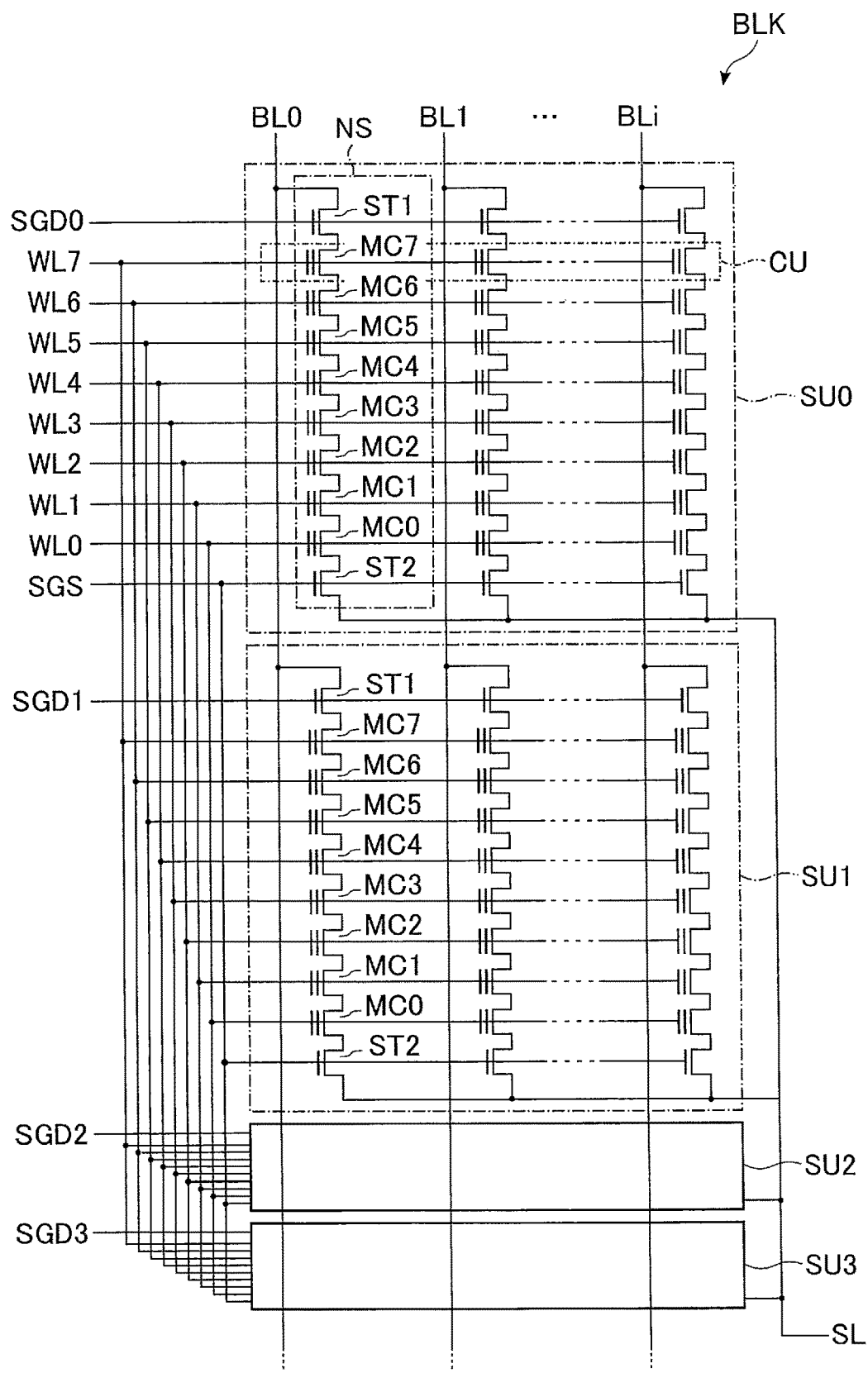
F I G. 3

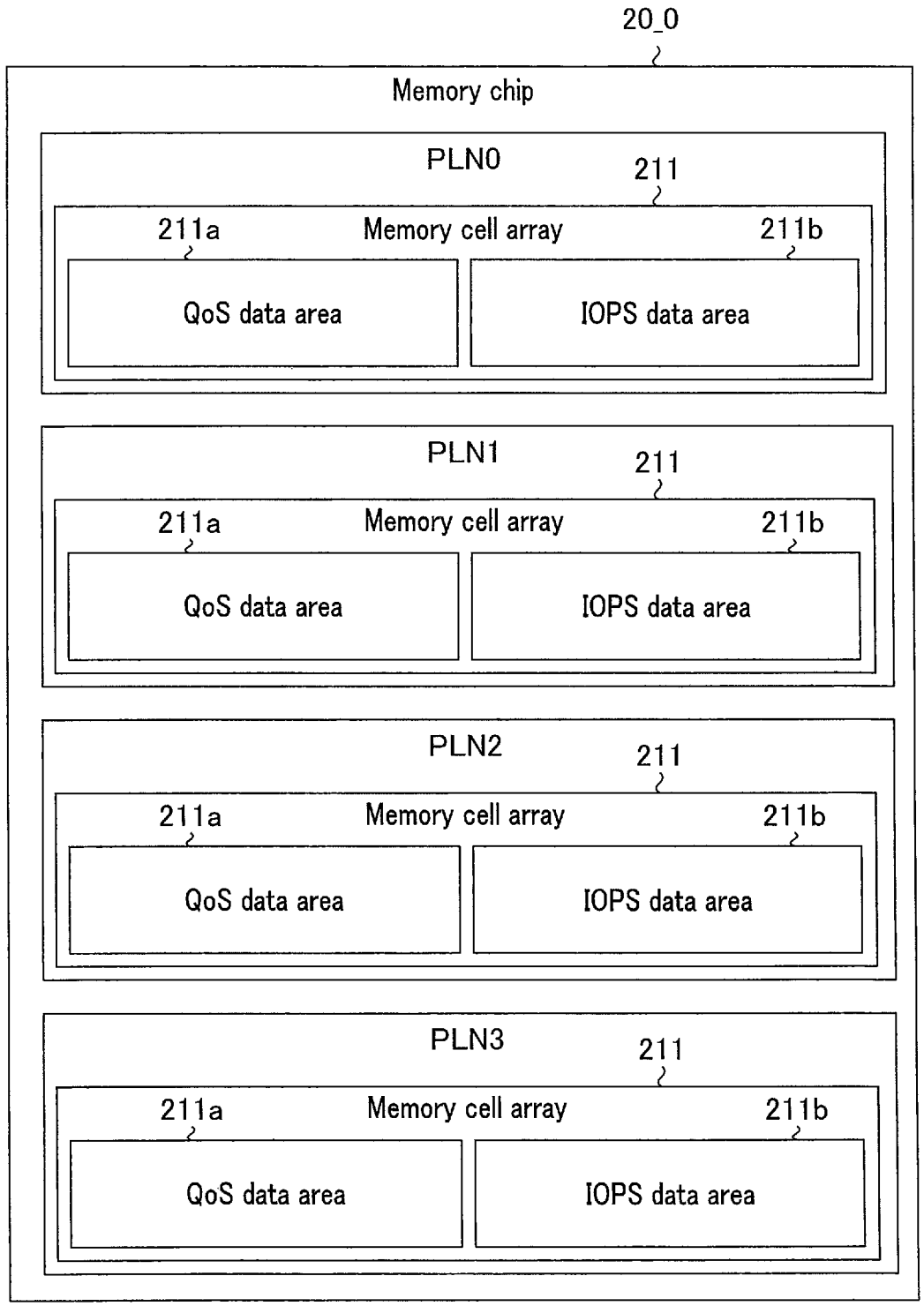
F I G. 4

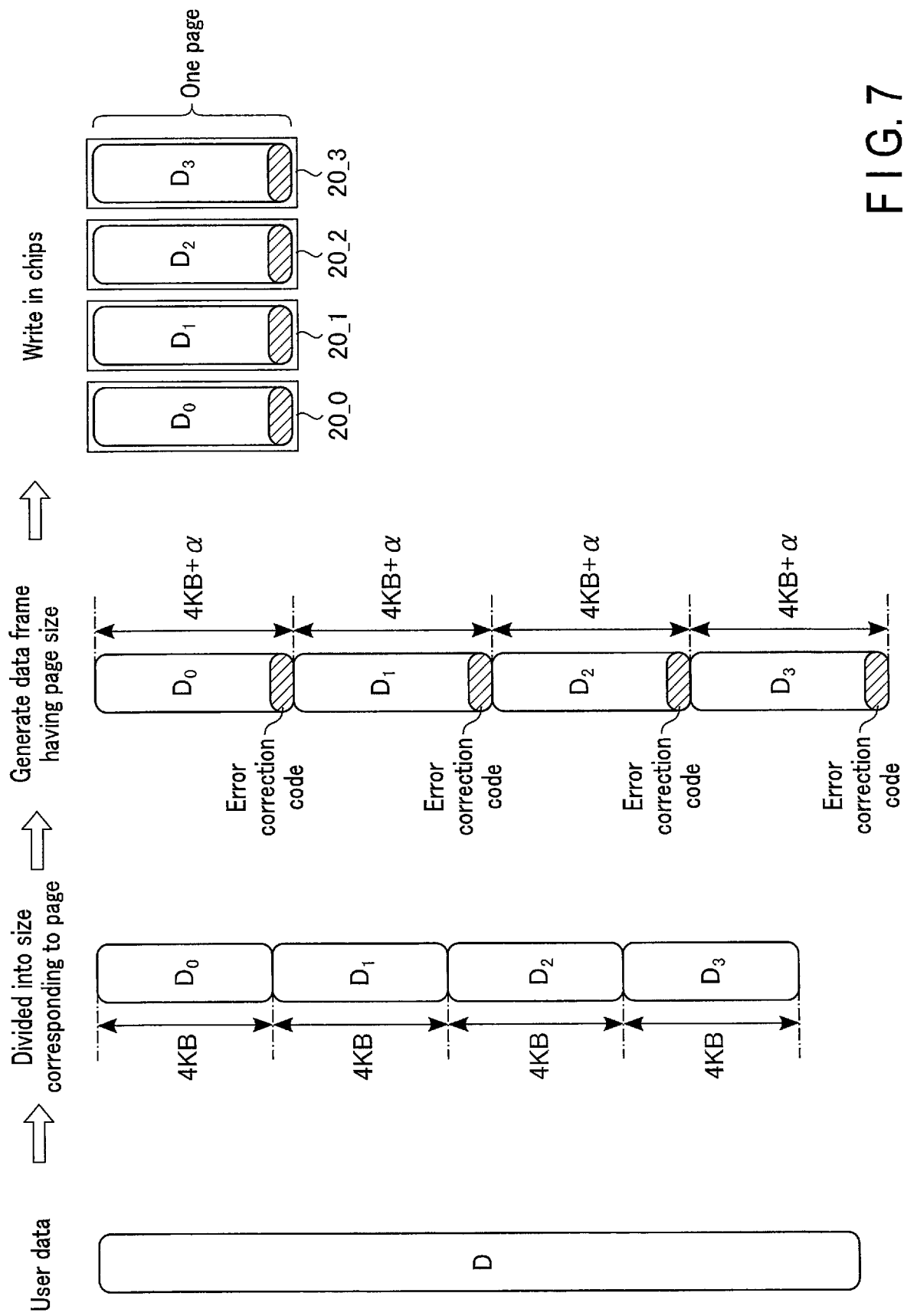
F I G. 7

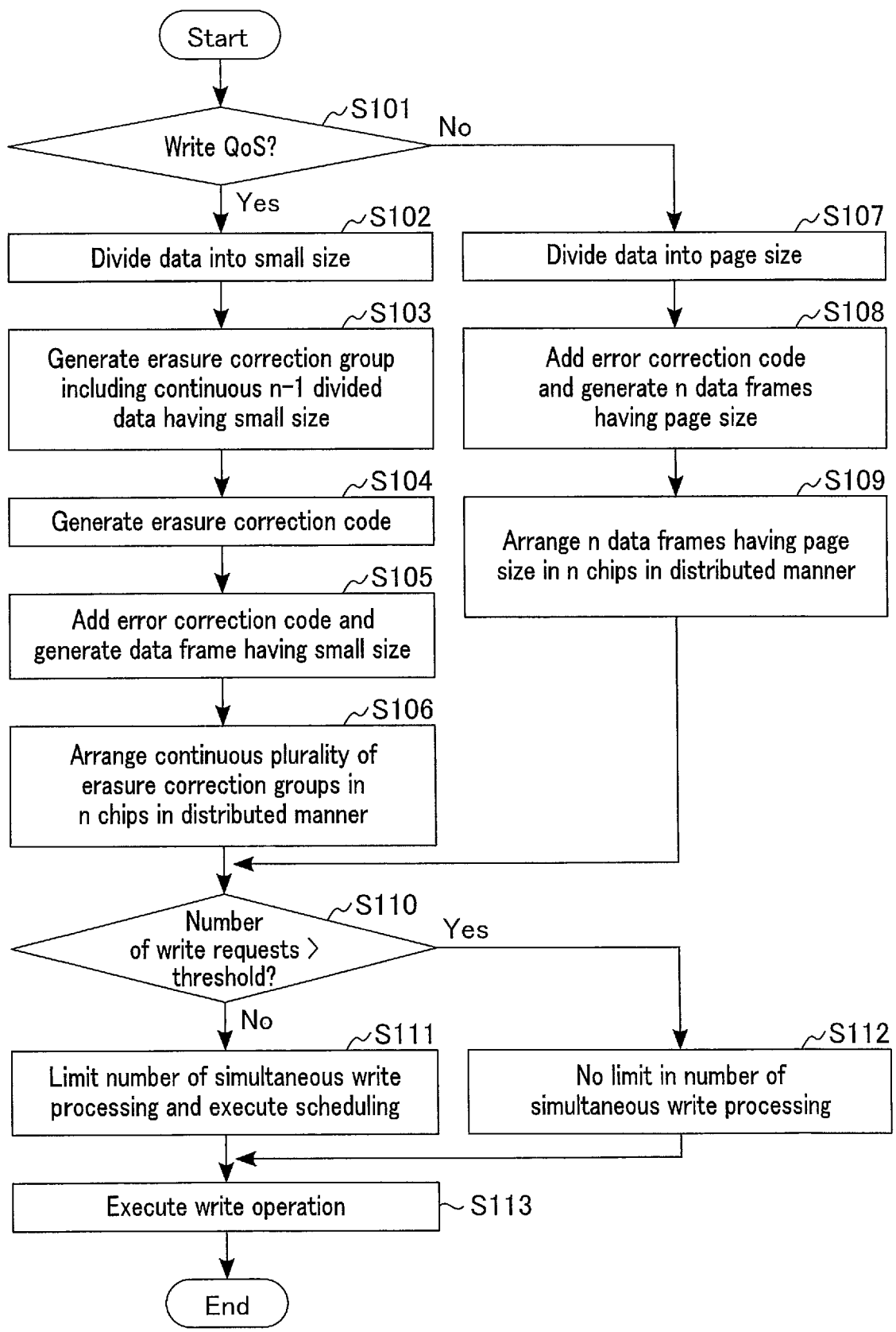
F I G. 9

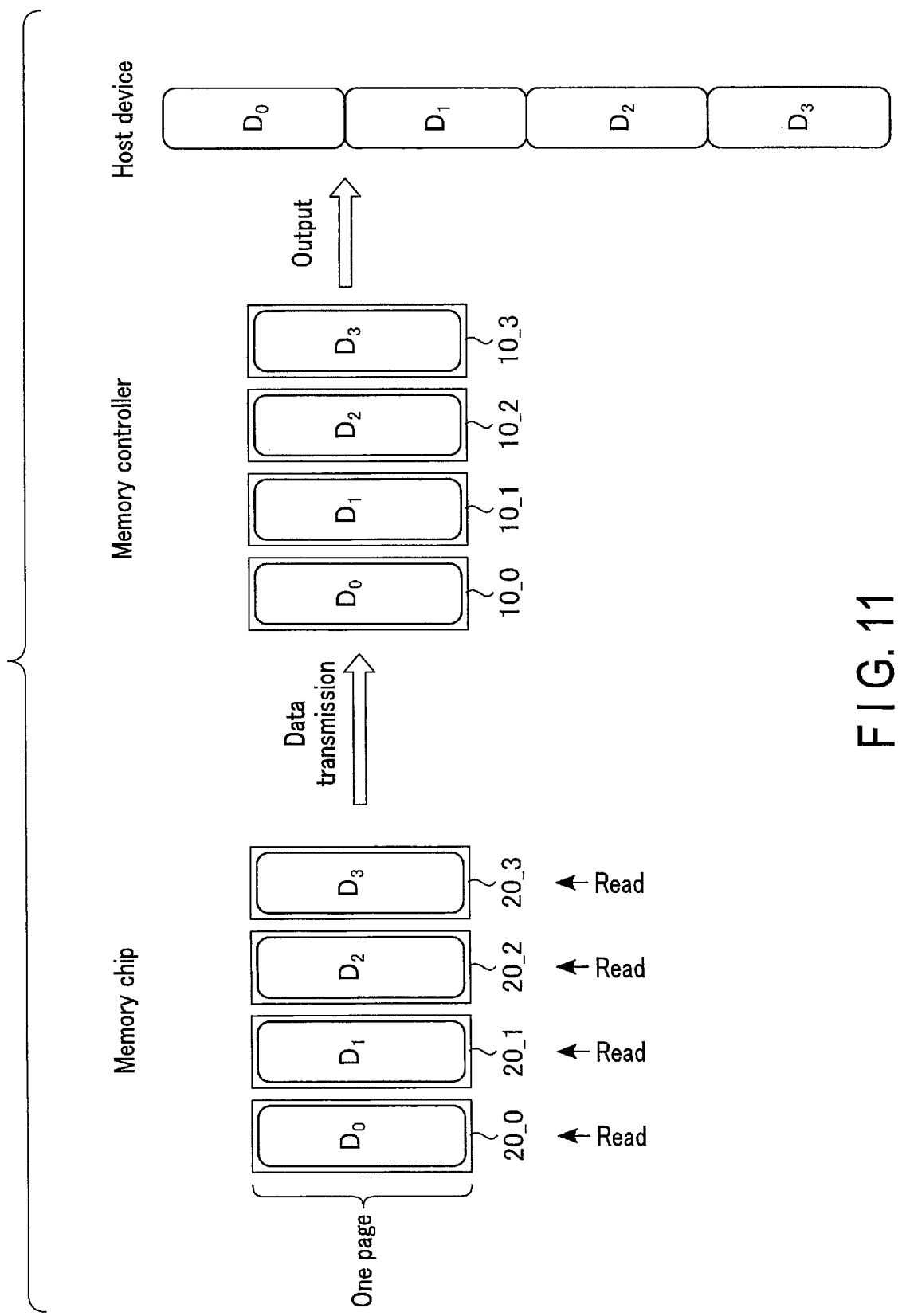
F I G. 11

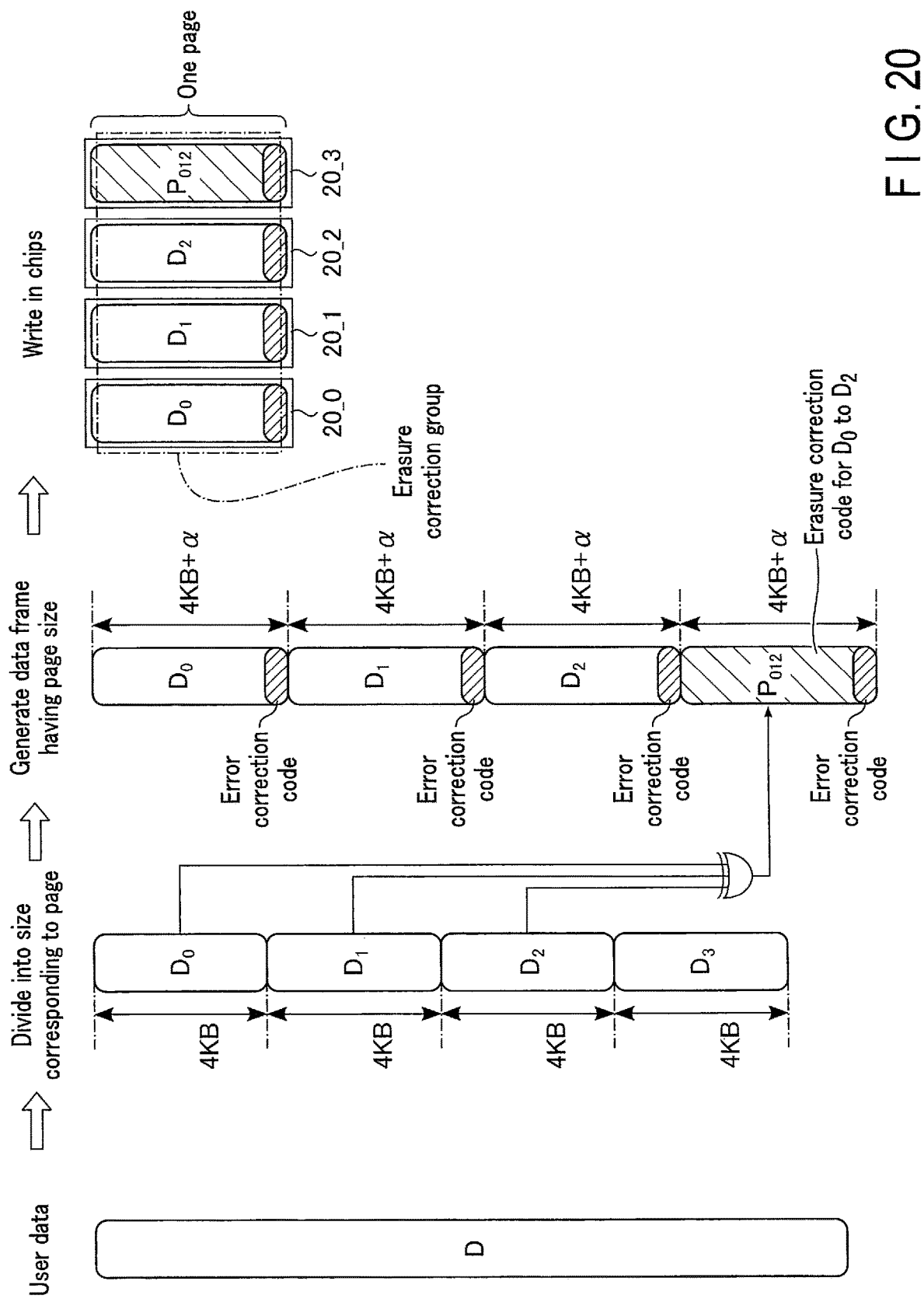
F I G. 20

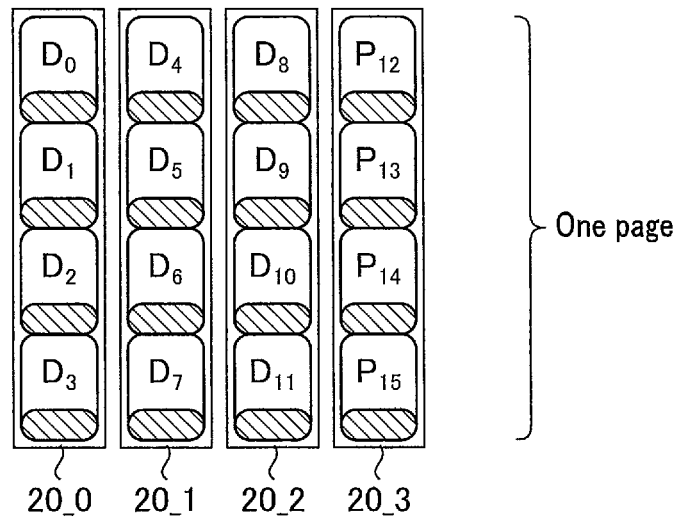
F I G. 21
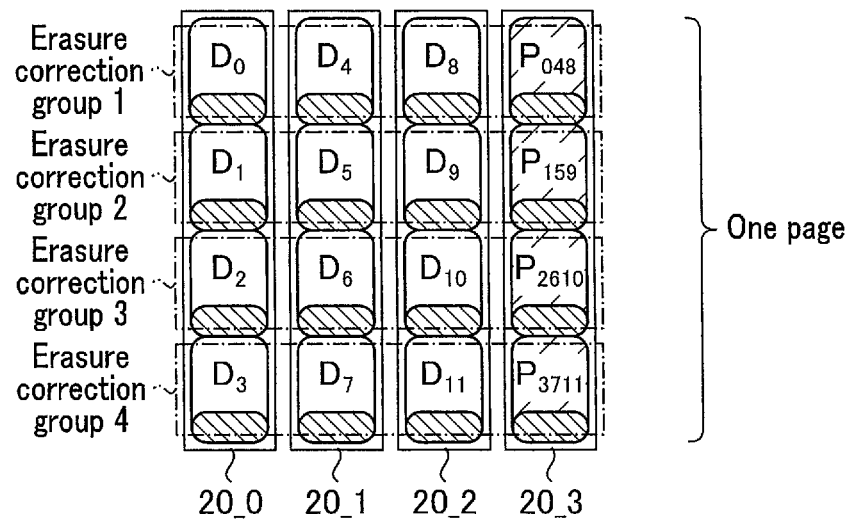
F I G. 22

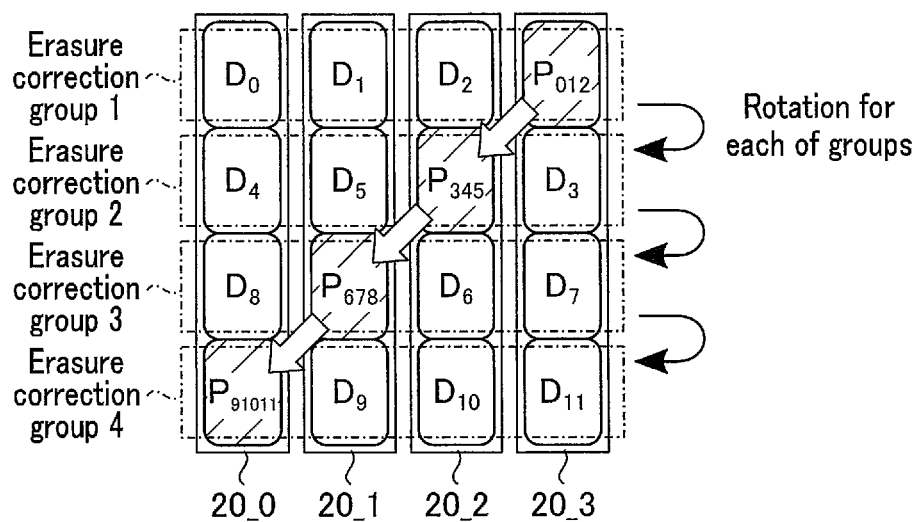
F I G. 23

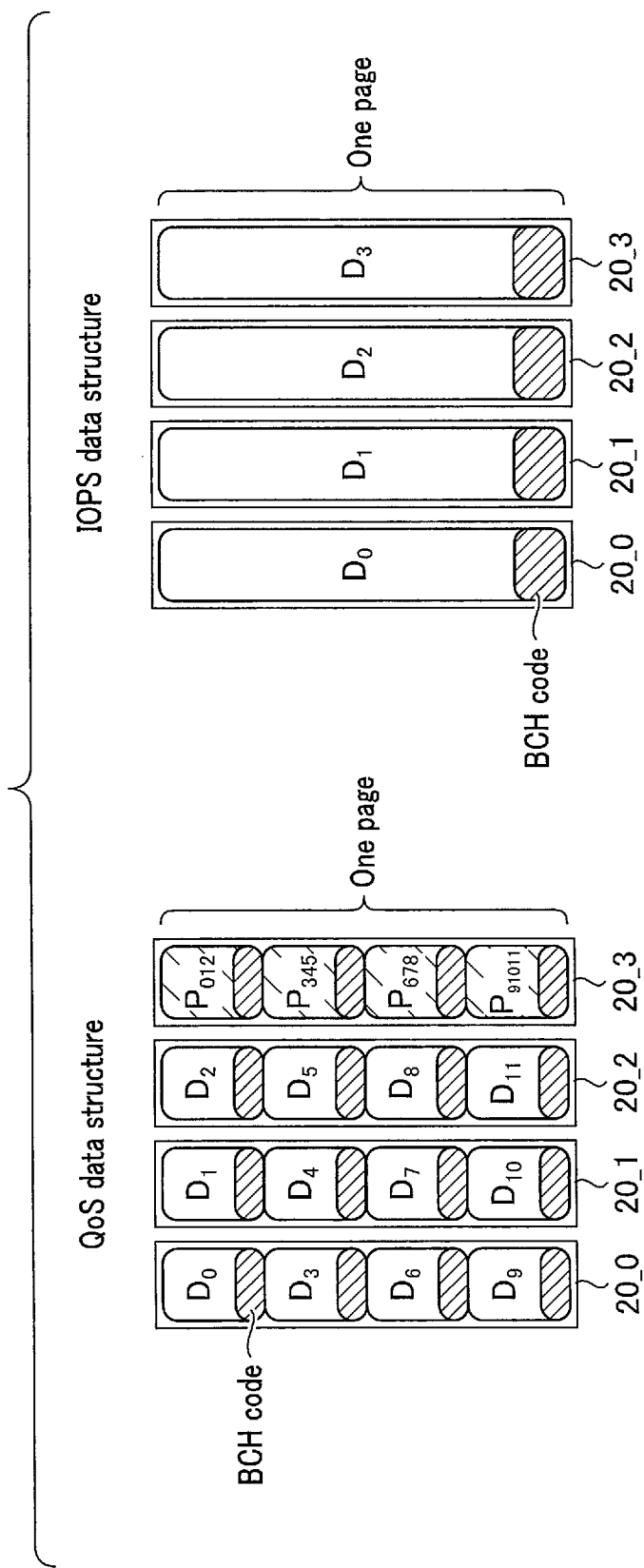
F I G. 24

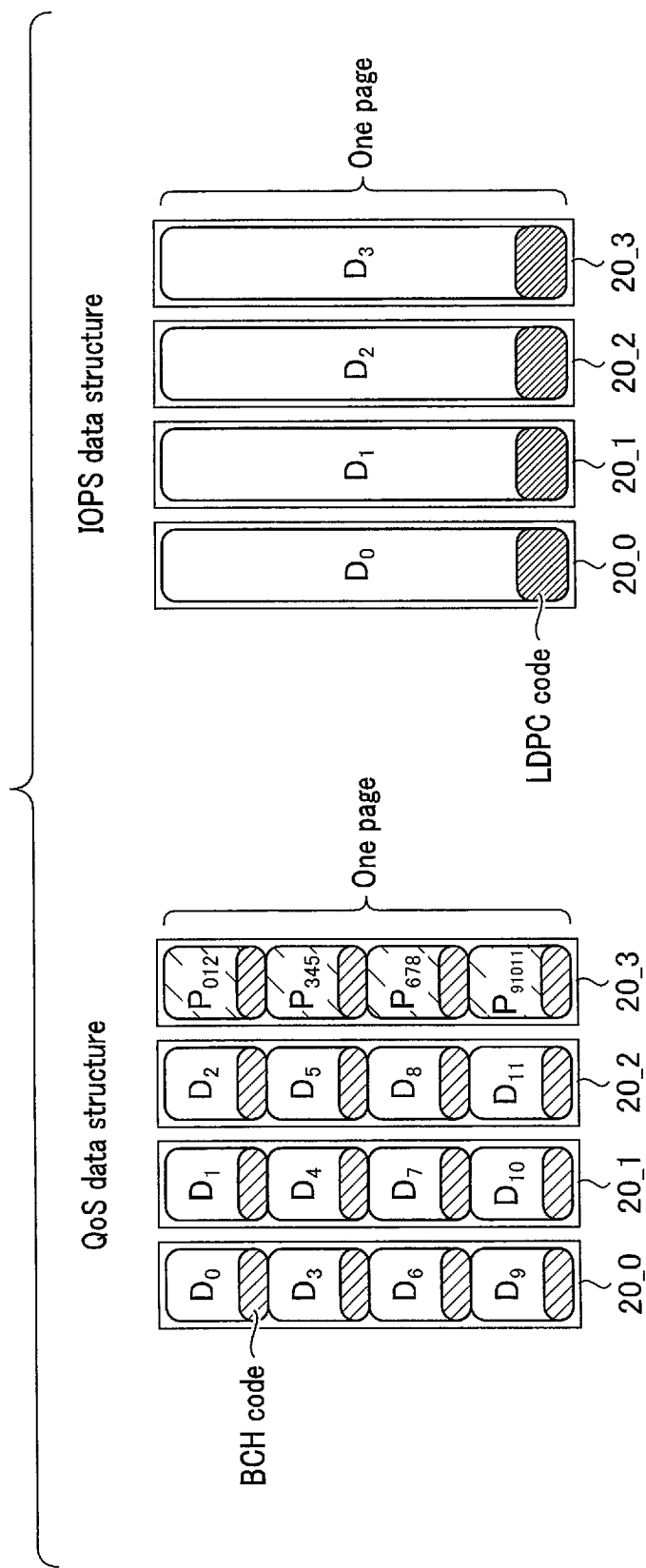
F I G. 25

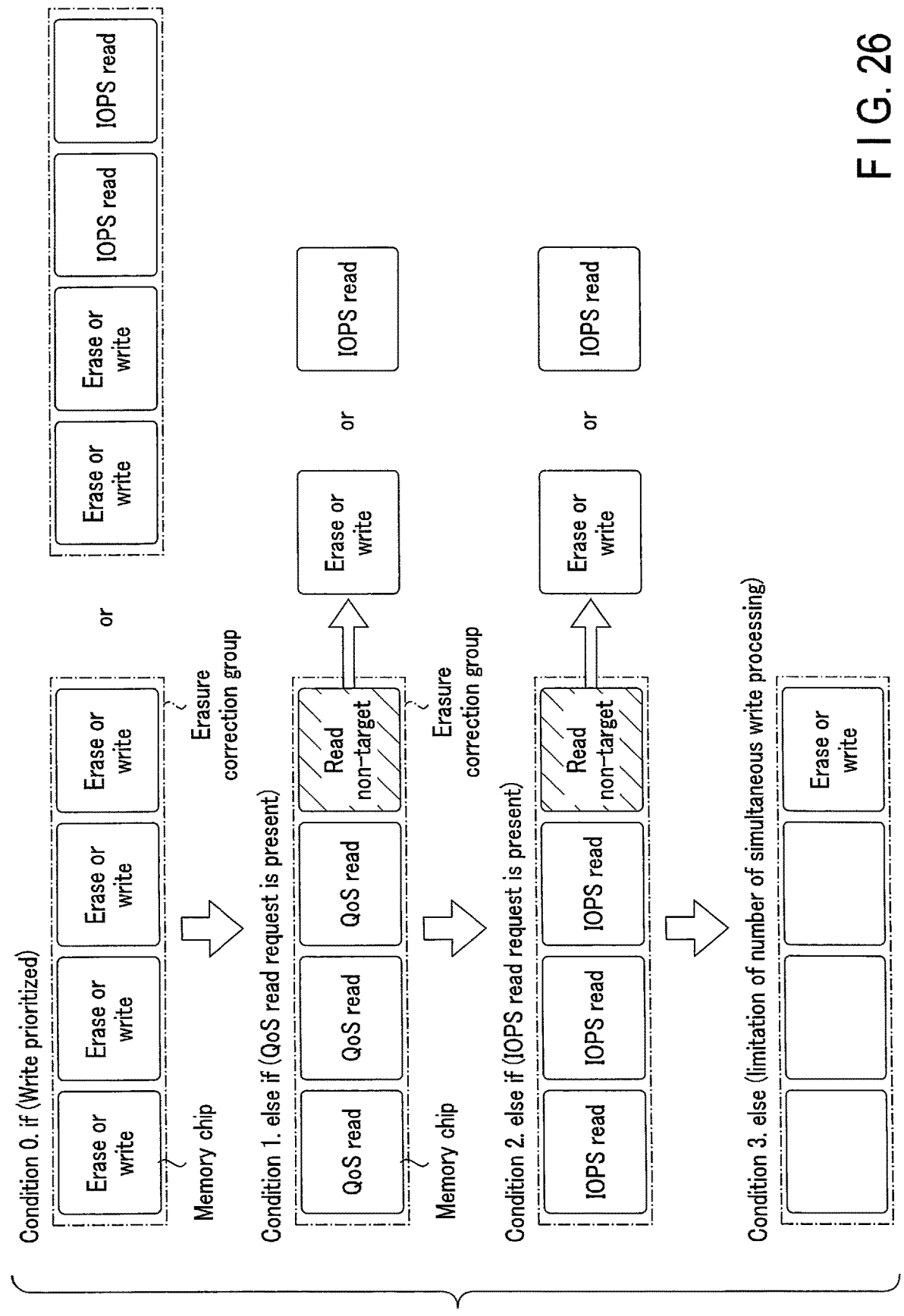
F I G. 26

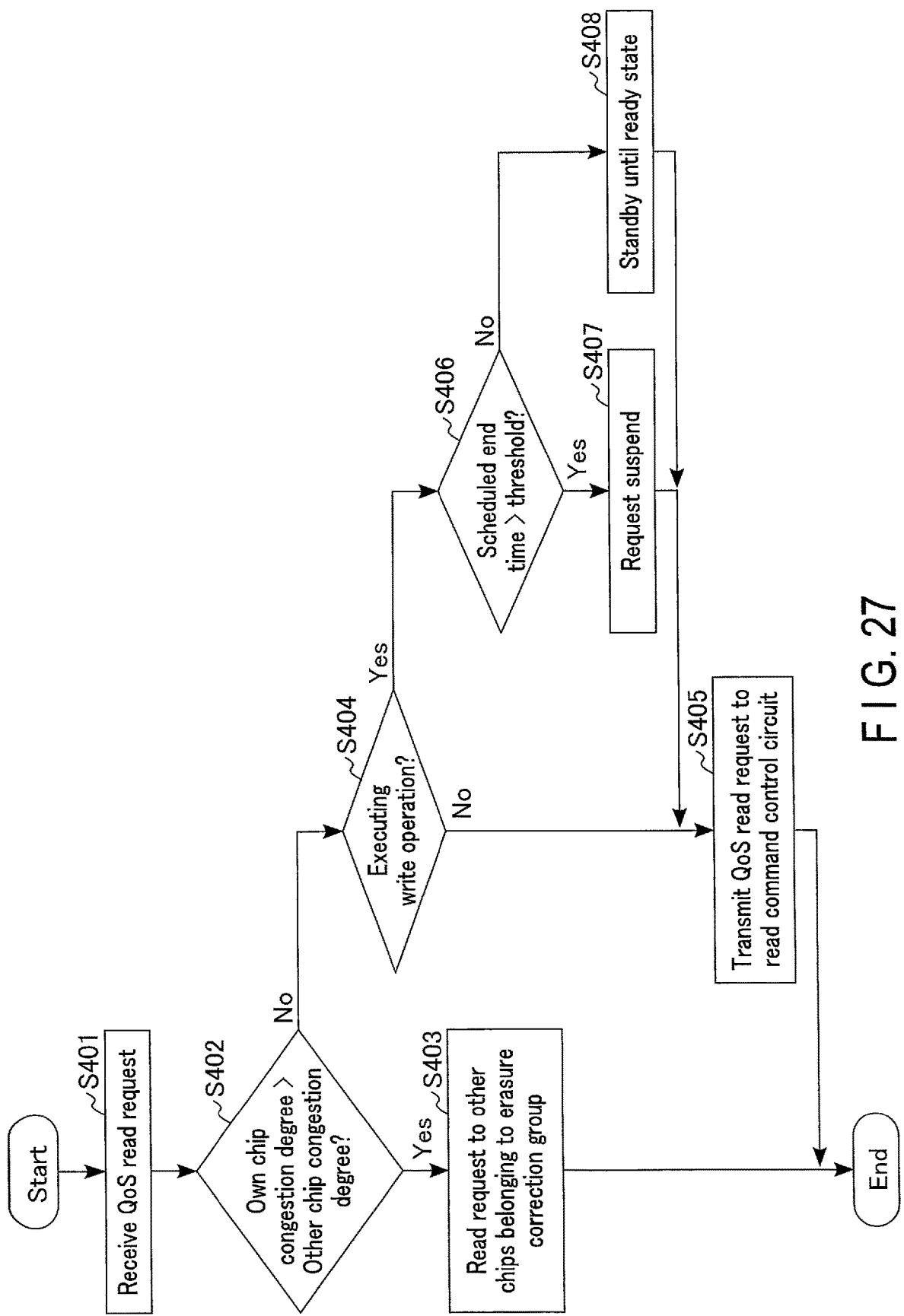
F I G. 27

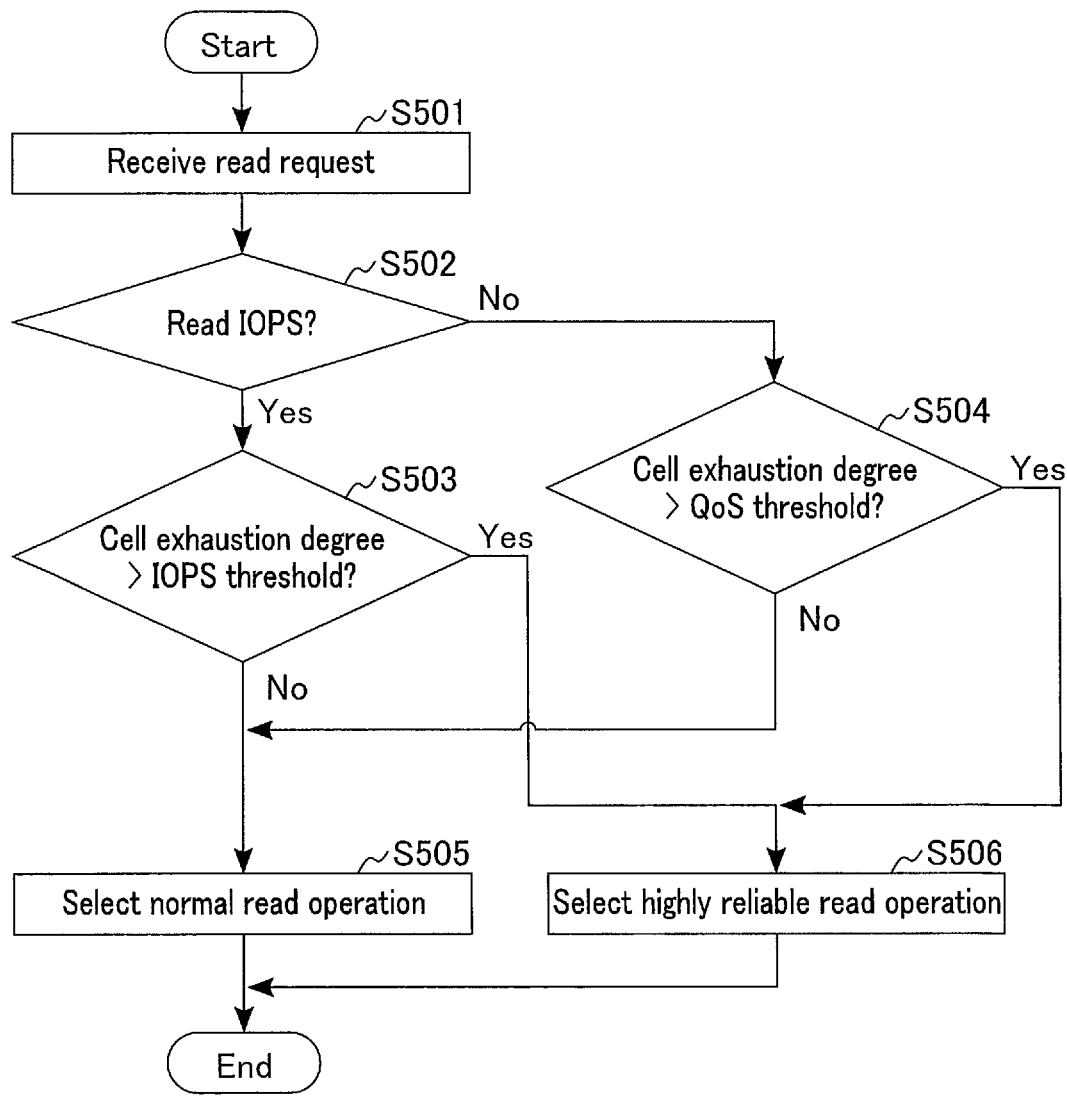
F I G. 29

MEMORY SYSTEM

CROSS-REFERENCE TO RELATED APPLICATIONS

This application is based upon and claims the benefit of priority from Japanese Patent Application No. 2021-150445, filed Sep. 15, 2021, the entire contents of which are incorporated herein by reference.

FIELD

Embodiments described herein relate generally to a memory system.

BACKGROUND

A memory system using a solid state drive (SSD) on which a nonvolatile semiconductor memory such as a NAND flash memory is mounted is known.

BRIEF DESCRIPTION OF THE DRAWINGS

FIG. 3 is a circuit diagram of a memory cell array included in the memory system according to the first embodiment;

FIG. 4 is a diagram illustrating an example of a memory area in the memory chip included in the memory system according to the first embodiment;

FIG. 7 is a diagram illustrating a flow of generating of IOPS page data in the memory system according to the first embodiment;

FIG. 9 is a flowchart of a write request in the memory system according to the first embodiment;

FIG. 11 is a diagram illustrating a flow of data in an IOPS read request in the memory system according to the first embodiment;

FIG. 20 is a diagram illustrating a flow of generating of IOPS page data in an IOPS write request in a case where IOPS page data includes an erasure correction code in a memory system according to a first example of a second embodiment;

FIG. 21 is a diagram illustrating an IOPS data structure in a case where IOPS page data does not include an erasure correction code in a memory system according to a second example of the second embodiment;

FIG. 22 is a diagram illustrating the LOPS data structure in a case where IOPS page data includes the erasure correction code in the memory system according to the second example of the second embodiment;

FIG. 23 is a diagram illustrating a QoS data structure in a memory system according to a third example of the second embodiment;

FIG. 24 is a diagram illustrating an example in which error correction codes of the same scheme are added to divided data of a QoS data structure and an IOPS data structure in a memory system according to a fourth example of the second embodiment;

FIG. 25 is a diagram illustrating an example in which the error correction codes of different schemes are added to the divided data of the QoS data structure and the LOPS data structure in the memory system according to the fourth example of the second embodiment;

FIG. 26 is a diagram illustrating a specific example of the operations of chips in priority control in a memory system according to a third embodiment;

FIG. 27 is a flowchart illustrating a flow of operation selection in a command flow control circuit included in a memory system according to a fourth embodiment;

FIG. 29 is a flowchart of a selection operation in a read command control circuit included in a memory system according to a fifth embodiment.

DETAILED DESCRIPTION

Figure 1:
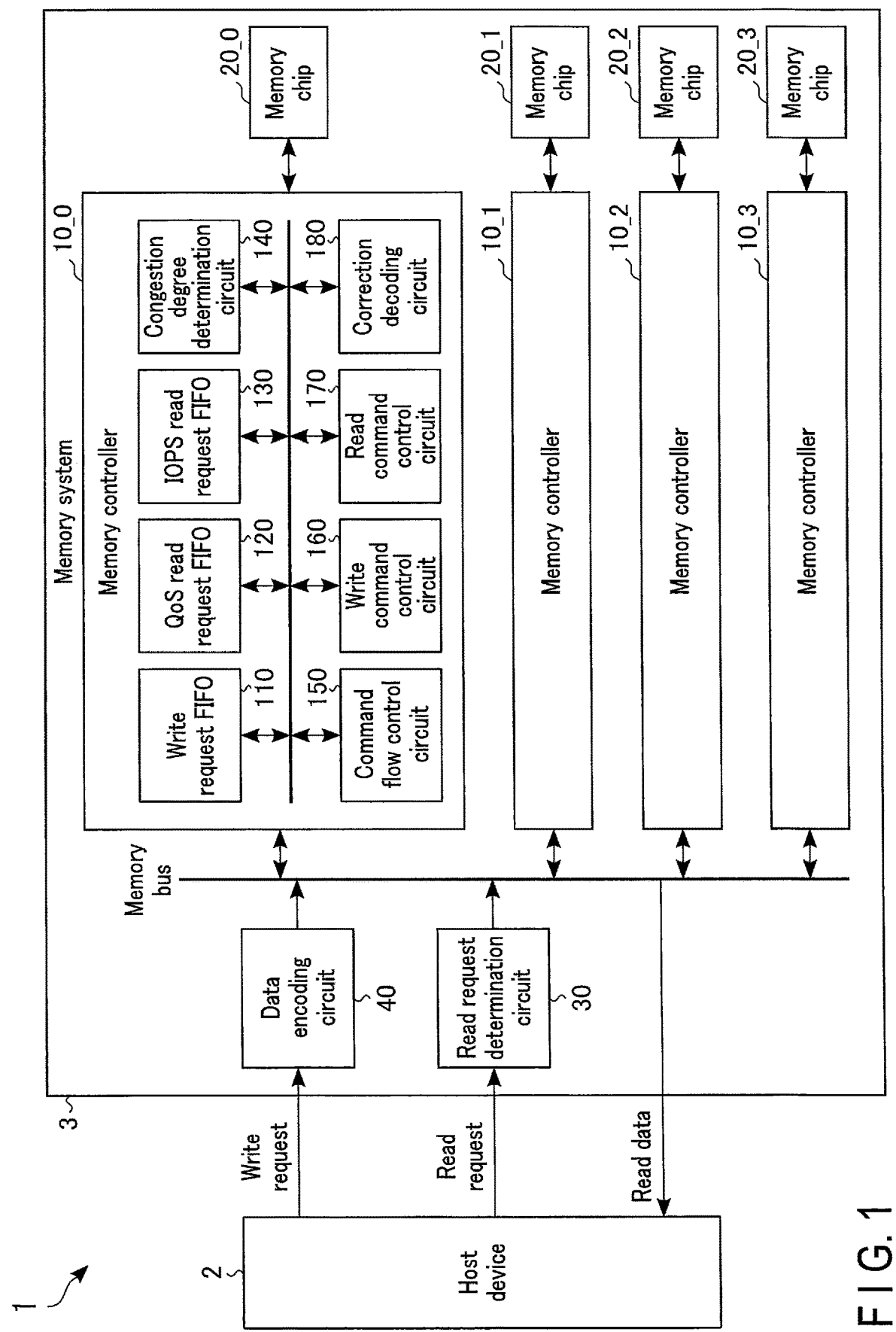
FIG. 1 is a block diagram illustrating an example of an overall configuration of a data processing device including a memory system according to a first embodiment.

In general, according to one embodiment, a memory system includes: a plurality of memory chips respectively including a plurality of first memory cells in which data is collectively written; a plurality of memory controllers respectively connected to the memory chips; and a data encoding circuit configured to divide user data into a first data size smaller than a page size for collectively writing the user data into the first memory cells, two or more of the first data sizes being included in the page size, form a first group including a continuous plurality of first divided data among the user data divided into the first data size, and generate a plurality of first page data in which the first divided data are distributed on the memory chips. The memory controllers are configured to adjust a schedule of a write operation among the memory controllers, control a number of the write operations to be simultaneously executed, and write the plurality of first page data in the memory chips. When at least one of the memory chips is in a busy state in a first read request for the plurality of first divided data, the memory controller connected to the memory chip in the busy state decodes the first divided data stored in the memory chip in the busy state through erasure correction decoding processing using the first divided data read from the memory chip not in the busy state.

Hereinafter, embodiments are explained with reference to the drawings. The drawings are schematic. Note that in the following explanation, components having substantially the same functions and configurations are denoted by the same reference numerals and signs. Numbers after the characters constituting the reference numerals and signs are used to distinguish elements having similar configurations.

Hereinafter, a memory system according to an embodiment is explained.

1. First Embodiment

1.1 Configuration

1.1.1 Configuration of Data Processing Device

First, an example of a configuration of a data processing device 1 including a memory system is explained with reference to FIG. 1. FIG. 1 is a block diagram illustrating an example of an overall configuration of the data processing device 1.

As illustrated in FIG. 1, the data processing device 1 includes a host device 2 and a memory system 3. Note that a plurality of memory systems 3 may be connected to the host device 2.

The host device 2 is an information processing device (a computing device) that accesses the memory system 3. The host device 2 controls the memory system 3. More specifically, for example, the host device 2 requests (instructs) the memory system 3 to perform a data write operation or a data read operation. That is, the host device 2 transmits a write request or a read request to the memory system 3. The write request includes, for example, a write command, a logical address, and user data. The read request includes, for example, a read command, a logical address, a data size of user data to be read, and an address of the host device 2 that receives the user data. In addition, the host device 2 receives data (user data) read by the memory system 3.

The memory system 3 is, for example, a solid state drive (SSD) including a nonvolatile memory. The memory system 3 is connected to the host device 2 via, for example, a bus. Note that the memory system 3 may be connected to the host device 2 via a network or wireless communication.

1.1.2 Configuration of Memory System

Subsequently, an example of a configuration of the memory system 3 is explained with reference to FIG. 1.

As illustrated in FIG. 1, the memory system 3 includes a plurality of memory controllers 10, a plurality of memory chips 20 (simply referred to as "chips 20" as well), a read request determination circuit 30, and a data encoding circuit 40. In the present embodiment, the memory system 3 writes the user data of the write request received from the host device 2 in the plurality of memory chips 20 in a distributed manner via, for example, the plurality of memory controllers 10. That is, the plurality of memory chips 20 is operated as one virtual memory space. The same applies to the read operation. The memory system 3 can read data from the plurality of memory chips 20 via the plurality of memory controllers 10 in response to the read request received from the host device 2.

The memory controller 10 is, for example, a system on a chip (SoC). The memory controller 10 controls the memory chip 20 based on a request from the host device 2. The memory controller 10 instructs the memory chip 20 to perform a write operation, a read operation, an erase operation, and the like of data. Note that functions of the memory controller 10 may be realized by a dedicated circuit or may be realized by a processor executing firmware.

In the example illustrated in FIG. 1, the memory system 3 includes four memory controllers 10_0, 10_1, 10_2, and 10_3. Note that the number of memory controllers 10 is arbitrary. In the present embodiment, the memory system 3 only has to include two or more memory controllers 10. Hereinafter, a case where the configurations of the memory controllers 10_0 to 10_3 are the same is explained. However, the configurations may be different from one another. In addition, when none of the memory controllers 10_0 to 10_3 is limited, the memory controllers 10_0 to 10_3 are referred to as memory controller 10. The memory controllers 10_0 to 10_3 are connected to one another via a memory bus.

The memory chip 20 may be a nonvolatile memory or a volatile memory. Hereinafter, a case where the memory chip 20 is a NAND flash memory is explained. Details of the memory chip 20 are explained below.

In the example illustrated in FIG. 1, the memory system 3 includes four memory chips 20_0, 20_1, 20_2, and respectively connected to the four memory controllers 10_0, 10_1, 10_2, and 10_3. Hereinafter, a case where the configurations of the memory chips 20_0 to 20_3 are the same is explained. However, the configurations may be different from one another. When none of the memory chips 20_0 to 20_3 is limited, the memory chips 20_0 to 20_3 are referred to as memory chip 20_3. Note that a plurality of memory chips 20 may be connected to one memory controller 10 or the memory controllers 10_0 to 10_3 may be connected to one memory chip 20. For example, in a case where the memory controllers 10_0 to 10_3 are connected to one memory chip 20, the memory controllers 10_0 to 10_3 can independently control different memory spaces in the memory chip 20.

The read request determination circuit 30 receives a read request from the host device 2. Then, the read request determination circuit 30 determines the received read request. The read request determination circuit 30 is connected to the host device 2 and connected to the memory controllers 10 via a memory bus.

In the present embodiment, the read request includes a quality of service (QoS) read request and an input output per second (IOPS) read request. The QoS read request is a read request prioritizing reduction of latency (a processing time). The IOPS read request is a read request prioritizing improvement of a data input/output amount per hour. Details of the read requests are explained later. The read request determination circuit 30 determines whether the read request received from the host device 2 is the QoS read request or the IOPS read request and transmits the read request to the memory controller 10 corresponding to the read request. Note that the host device 2 may designate the QoS read request or the IOPS read request or the memory system 3 may designate the QoS read request or the IOPS read request based on the read request received from the host device 2.

For example, when the host device 2 designates the QoS read request or the IOPS read request, the host device 2 may include, in the read request, a flag indicating whether the read request is the QoS read request. The read request determination circuit 30 can determine whether the received read request is the QoS read request or the IOPS read request based on the flag.

Furthermore, for example, in a case where the host device 2 does not designate the QoS read request and the IOPS read request, the read request determination circuit can determine, based on, for example, information (a logical address, data size, or the like) in the read request, whether the received read request is the QoS read request or the IOPS read request.

The data encoding circuit 40 generates write data based on the received user data. In the write data, the structure of data to be collectively written in one memory chip 20 is different between a case corresponding to the QoS read request and a case corresponding to the IOPS read request. Details of a data configuration are explained below. Hereinafter, a data structure corresponding to the QoS read request is referred to as "QoS data structure". On the other hand, a data structure corresponding to the IOPS read request is referred to as "IOPS data structure". The data encoding circuit 40 generates write data having the QoS data structure or the IOPS data structure based on, for example, a write request.

The data encoding circuit 40 divides the user data included in the write request. The data encoding circuit generates an error correction code to be used for error checking and correcting (ECC) processing of data by a forward error correction (FEC) scheme and adds the error correction code to the divided data (user data). In addition, the data encoding circuit 40 generates an erasure correction code based on the divided data. The erasure correction code is used to, for example, when there is the memory chip 20 from which data cannot be read, decode, based on data of the other memory chips 20 and the erasure correction code, data of the memory chip from which data could not be read. The data encoding circuit 40 transmits a write request including the generated write data to the plurality of memory controllers 10 corresponding to the write request.

Note that the data encoding circuit 40 may be provided in the host device 2. In this case, the host device 2 transmits a write request including the write data of the QoS data structure or the write data of the IOPS data structure generated by the data encoding circuit 40 to each of the target memory controllers 10.

Next, an internal configuration of the memory controller 10 will be explained. The memory controller 10 includes a write request FIFO 110, a QoS read request FIFO 120, an IOPS read request FIFO 130, a congestion degree determination circuit 140, a command flow control circuit 150, a write command control circuit 160, a read command control circuit 170, and a correction decoding circuit 180. The write request FIFO 110, the QoS read request FIFO 120, the IOPS read request FIFO 130, the congestion degree determination circuit 140, the command flow control circuit 150, the write command control circuit 160, the read command control circuit 170, and the correction decoding circuit 180 are connected to one another via an internal bus provided in the memory controller 10.

A write request FIFO (First In First Out) 110 is a buffer circuit. The write request FIFO 110 stores write requests received from the data encoding circuit 40 in a FIFO format. The write request FIFO 110 transmits the write requests to the command flow control circuit 150 in order in which the write requests are input. Note that, when the write request includes priority information, the write request FIFO 110 may change the order of a plurality of write requests in the write request FIFO 110 based on the priority information.

The QoS read request FIFO 120 is a buffer circuit. The QoS read request FIFO 120 stores QoS read requests received from the read request determination circuit 30 in a FIFO format. The QoS read request FIFO 120 transmits the QoS read requests to the command flow control circuit 150 in order in which the QoS read requests are input. Note that, when the QoS read request includes priority information, the QoS read request FIFO 120 may change the order of a plurality of QoS read requests in the QoS read request FIFO 120 based on the priority information.

The IOPS read request FIFO 130 is a buffer circuit. The IOPS read request FIFO 130 stores IOPS read requests received from the read request determination circuit 30 in a FIFO format. The IOPS read request FIFO 130 transmits the IOPS read requests to the command flow control circuit 150 in order in which the IOPS read requests are input. Note that, when the IOPS read request includes priority information, the IOPS read request FIFO 130 may change the order of a plurality of IOPS read requests in the IOPS read request FIFO 130 based on the priority information.

The congestion degree determination circuit 140 determines a congestion degree of the memory chip 20 (hereinafter referred to as "own chip" as well) connected to the memory controller 10. More specifically, the congestion degree determination circuit 140 generates congestion degree information of the own chip 20 based on the number of requests stored in the write request FIFO 110, the QoS read request FIFO 120, and the IOPS read request FIFO 130 in the memory controller 10. The congestion degree determination circuit 140 shares congestion degree information with the congestion degree determination circuits 140 of the other memory controllers 10. Then, the congestion degree determination circuit 140 transmits, to the command flow control circuit 150, a congestion degree determination result obtained by comparing the congestion degree information of the own chip 20 with congestion degree information of the memory chips 20 (hereinafter referred to as "other chips" as well) connected to the other memory controllers 10.

The command flow control circuit 150 is a circuit that controls an operation in the own chip 20. The command flow control circuit 150 receives requests from the write request FIFO 110, the QoS read request FIFO 120, and the IOPS read request FIFO 130. The command flow control circuit 150 transmits and receives a read request to and from the other memory controllers 10. In addition, the command flow control circuit 150 receives the congestion degree determination result from the congestion degree determination circuit 140.

When receiving a write request or a read request from, for example, the write request FIFO 110, the QoS read request FIFO 120, the IOPS read request FIFO 130, or the other memory controllers 10, the command flow control circuit 150 determines, based on the congestion degree determination result, whether to cause the own chip 20 to execute an operation.

When determining to cause the own chip 20 to execute the read operation, the command flow control circuit 150 transmits a read request to the read command control circuit 170. In addition, when determining to decode data of the own chip 20 through the erasure correction decoding processing without selecting the read operation in the own chip 20, the command flow control circuit 150 transmits a read request to the other memory controllers 10.

When determining to cause the own chip 20 to execute the write operation or the erase operation, the command flow control circuit 150 executes schedule adjustment for the write operation or the erase operation with the other memory controllers 10 (hereinafter referred to as "scheduling control").

More specifically, the memory system 3 of the present embodiment can limit the number of write operations (or erase operations) that can be simultaneously executed in the plurality of memory controllers 10. Note that "simultaneously execute" includes a state in which the write operations or the erase operations are executed in parallel at any timing. Timings of starts or ends of a plurality of operations executed in parallel or the lengths of execution periods of the operations may be different. For example, the plurality of memory controllers 10 are connected to one another in a token ring control scheme. The memory system 3 can give a control right to the command flow control circuits 150 of the memory controllers 10 using, for example, the token ring control scheme. When causing the own chip 20 to execute the write operation, the command flow control circuit 150 performs schedule adjustment with the other memory controllers 10 so that the number of write operations to be executed simultaneously falls within a preset number. With the scheduling control, the memory controller 10 that is not executing the write operation can respond to the QoS read request without delay. When the write operation of the own chip 20 becomes executable as a result of the scheduling control, the command flow control circuit 150 transmits a write request to the write command control circuit 160.

When receiving a plurality of requests, the command flow control circuit 150 prioritizes the requests to be executed by the own chip 20 (Hereinafter, referred to as "priority control"). For example, in order to reduce the latency of the QoS read request, the command flow control circuit 150 more preferentially executes the QoS read request than the IOPS read request, the write operation, and the erase operation.

When the own chip 20 is executing the write operation, the command flow control circuit 150 can transmit a suspend request for the write operation to the write command control circuit 160. After requesting the write command control circuit 160 to suspend the write operation, the command flow control circuit 150 can transmit a read request to the read command control circuit 170. More specifically, when the own chip 20 is executing the write operation, the command flow control circuit 150 can acquire write control information from the write command control circuit 160. The write control information includes information concerning a status of the write operation and an end scheduled time of the write operation. For example, the command flow control circuit 150 selects, based on the write control information, whether to wait for the read operation until the write operation ends or suspend the write operation or not to execute the read operation.

The write command control circuit 160 controls the write operation of the own chip 20. When receiving the write request from the command flow control circuit 150, the write command control circuit 160 issues a write command and transmits the write command to the own chip together with write data.

The write command control circuit 160 has a completion time management function and a suspend function for the write operation executed by the own chip 20. For example, the write command control circuit 160 generates write control information of the write operation executed by the own chip 20 and transmits the write control information to the command flow control circuit 150. For example, when receiving a suspend request for the write operation from the command flow control circuit 150, the write command control circuit 160 issues a suspend command and transmits the suspend command to the own chip 20.

The read command control circuit 170 controls the read operation of the own chip 20. When receiving the read request from the command flow control circuit 150, the read command control circuit 170 issues a read command and transmits the read command to the own chip 20. The read command control circuit 170 receives data read from the own chip 20. At this time, the read command control circuit 170 can control an amount of data to be read (received) from the memory chip 20. For example, in the case of a read operation corresponding to the IOPS read request (hereinafter referred to as "IOPS read operation"), the read command control circuit 170 reads, from the memory chip 20, data having the same size as a size of data collectively written in the memory chip 20. On the other hand, for example, in the case of a read operation corresponding to the QoS read request (hereinafter referred to as "QoS read operation"), the read command control circuit 170 reads, from the memory chip 20, data smaller than the size of data collectively written in the memory chip 20. As a result, the latency of the QoS read request can be reduced.

The read command control circuit 170 transmits the data read from the memory chip 20 to the correction decoding circuit 180.

The correction decoding circuit 180 executes ECC processing and erasure correction decoding processing. For example, when receiving the data of the own chip 20, the correction decoding circuit 180 executes the ECC processing. The data after the ECC processing is transmitted to the host device 2 or the other memory controllers 10. When not reading data from the own chip the correction decoding circuit 180 executes the erasure correction decoding processing based on data (including erasure correction codes) of the other chips 20 and decodes the data of the own chip 20. The correction decoding circuit 180 transmits the decoded data to the host device 2.

Note that the correction decoding circuit 180 may be provided outside the memory controller 10 in the memory system 3 or may be provided in the host device 2. For example, the memory controller 10 includes a memory (not illustrated) for storing data for executing the ECC processing and the erasure correction decoding processing in the correction decoding circuit 180. By providing the correction decoding circuit 180 in the host device 2, the memory in the memory controller 10 can be eliminated.

1.1.3 Configuration of Memory Chip

Figure 2:
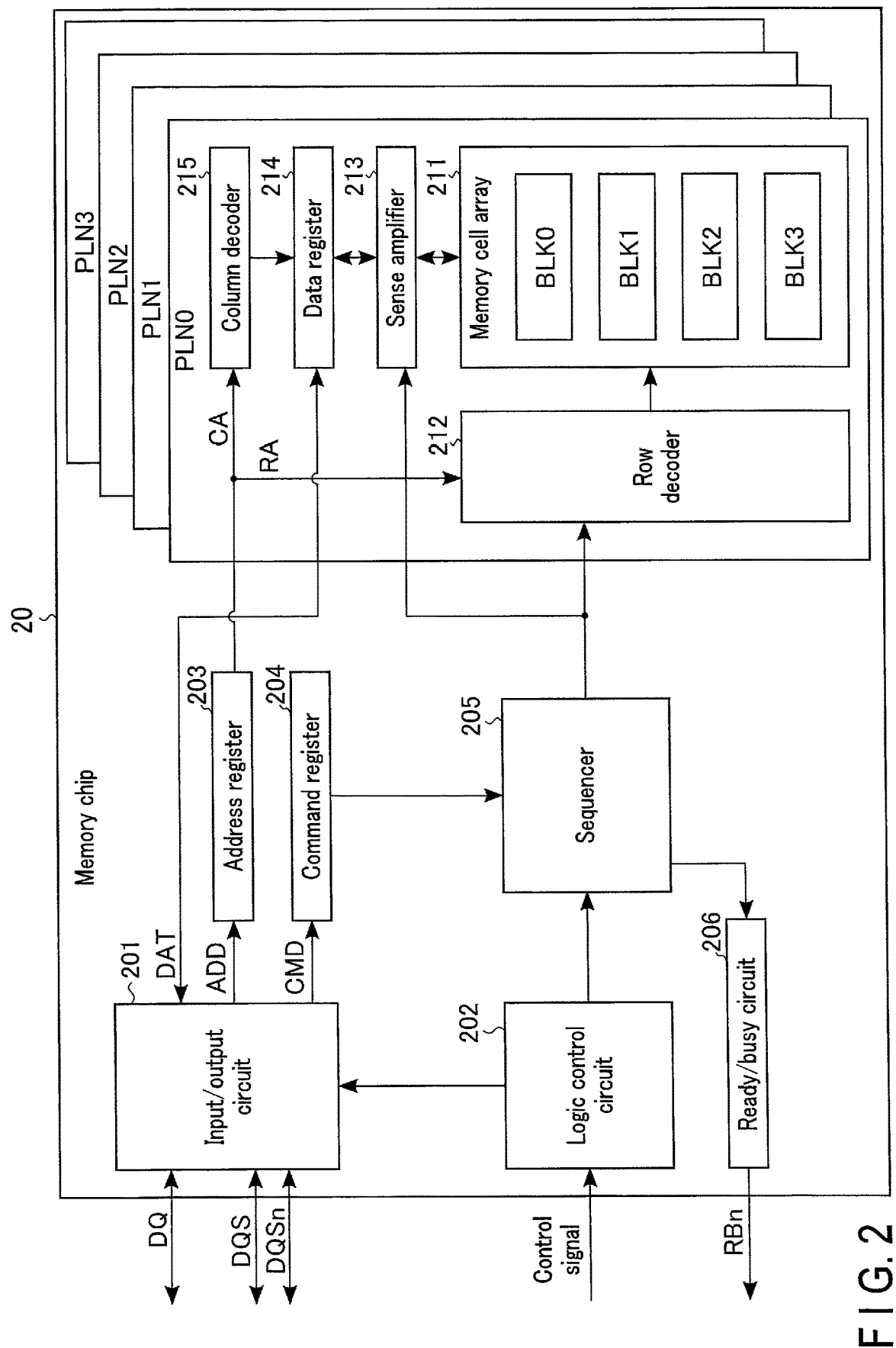
FIG. 2 is a block diagram illustrating a basic configuration of a memory chip included in the memory system according to the first embodiment.

Next, an example of a configuration of the memory chip 20 is explained with reference to FIG. 2. FIG. 2 is a block diagram illustrating a basic configuration of the memory chip 20. Note that, in the example illustrated in FIG. 2, a part of connection of blocks is indicated by arrow lines. However, the connection among the blocks is not limited to this.

As illustrated in FIG. 2, the memory chip 20 is, for example, a NAND flash memory. The memory chip 20 is connected to the memory controller 10. The memory chip 20 operates based on an instruction from the memory controller 10. The memory chip 20 transmits and receives a signal DQ and clock signals DQS and DQSn to and from the memory controller 10. The signal DQ is, for example, data DAT, an address ADD, or a command CMD. The clock signals DQS and DQSn are clock signals used at the time of input and output of the data DAT. The clock signal DQSn is an inverted signal of the clock signal DQS.

In addition, the memory chip 20 receives various control signals from the memory controller 10. In addition, the memory chip 20 transmits a ready/busy signal RBn to the memory controller 10. The ready/busy signal RBn is a signal indicating whether the memory chip is in a state of being incapable of receiving the signal DQ from the memory controller 10 or in a state of being capable of receiving the signal DQ. The busy state is a state in which the memory chip 20 is incapable of receiving the DQ signal from the memory controller 10. The ready state is a state in which the memory chip 20 is capable of receiving the DQ signal from the memory controller 10.

Next, an internal configuration of the memory chip will be explained. The memory chip 20 includes an input/output circuit 201, a logic control circuit 202, an address register 203, a command register 204, a sequencer 205, a ready/busy circuit 206, and a plurality of planes PLN.

The input/output circuit 201 is a circuit that inputs and outputs the signal DQ. The input/output circuit 201 is connected to the memory controller 10. In addition, the input/output circuit 201 is connected to the address register 203, the command register 204, and data registers 214 of the planes PLN. In a case where the input signal DQ is the data DAT, the input/output circuit 201 receives the input signal DQ based on the clock signals DQS and DQSn. Then, the input/output circuit 201 transmits the data DAT to the data register 214 of the plane PLN corresponding to the data DAT. In addition, the input/output circuit 201 outputs the data DAT to the memory controller 10 together with the clock signals DQS and DQSn. A data size of the data DAT transmitted to the memory controller 10 can be adjusted based on the number of toggles of the clock signals DQS and DQSn. Note that the number of toggles of the clock signals DQS and DQSn is based on the number of toggles of a control signal (For example, a read enable signal) received from the memory controller 10. Accordingly, the memory controller controls the data size of the data DAT output from the memory chip 20.

In addition, when the input signal DQ is the address ADD, the input/output circuit 201 transmits the address ADD to the address register 203.

In addition, when the input signal DQ is the command CMD, the input/output circuit 201 transmits the command CMD to the command register 204.

The logic control circuit 202 is a circuit that performs logic control based on control signals. The logic control circuit 202 is connected to the memory controller 10. In addition, the logic control circuit 202 is connected to the input/output circuit 201 and the sequencer 205. The logic control circuit 202 receives various control signals from the memory controller 10. The logic control circuit 202 controls the input/output circuit 201 and the sequencer 205 based on the received control signals.

The address register 203 is a register that temporarily stores the address ADD. The address register 203 is connected to row decoders 212 and column decoders 215 of the planes PLN. The address ADD includes a row address RA and a column address CA. The address register 203 transfers the row address RA to the row decoder 212. The address register 203 transfers the column address CA to the column decoder 215.

The command register 204 is a register that temporarily stores the command CMD. The command register 204 is connected to the sequencer 205. The command register 204 transfers the command CMD to the sequencer 205.

The sequencer 205 is a circuit that controls the memory chip 20. The sequencer 205 controls the operation of the entire memory chip 20. More specifically, the sequencer 205 controls the ready/busy circuit 206, the row decoder 212, a sense amplifier 213, the data register 214, the column decoder 215, and the like. The sequencer 205 executes a write operation, a read operation, and an erase operation based on the command CMD.

The ready/busy circuit 206 is a circuit that transmits a ready/busy signal RBn. The ready/busy circuit 206 transmits a ready/busy signal RBn to the memory controller 10 according to an operation status of the sequencer 205.

The plane PLN is a unit that performs a data write operation and a data read operation. In the example illustrated in FIG. 2, the memory chip 20 includes four planes PLN0, PLN1, PLN2, and PLN3. Note that the number of plane PLN is not limited to four. The number of planes PLN may be one or may be more than one other than four. The planes PLN0 to PLN3 are capable of operating independently from one another. The planes PLN0 to PLN3 are capable of operating in parallel as well. For example, in a case where the memory controllers 10_0 to 10_3 are connected to one memory chip 20, the memory controllers 10_0 to 10_3 may respectively control the planes PLN0 to PLN3.

Next, an internal configuration of the plane PLN will be explained. In the following explanation, a case where the planes PLN0 to PLN3 have the same configuration is explained. Note that the configurations of the planes PLN may be different. Hereinafter, when none of the planes PLN0 to PLN3 is limited, the planes PLN0 to PLN3 are referred to as a "plane PLN". The plane PLN includes a memory cell array 211, the row decoder 212, the sense amplifier 213, the data register 214, and the column decoder 215.

The memory cell array 211 is a set of an arrayed plurality of memory cell transistors. The memory cell array 211 includes, for example, four blocks BLK0, BLK1, BLK2, and BLK3. Note that the number of blocks BLK in the memory cell array 211 is optional. The block BLK is, for example, a set of a plurality of memory cell transistors from which data is collectively erased. That is, the block BLK is a data erasing unit. Details of the configuration of the block BLK are explained below.

The row decoder 212 is a decode circuit for the row address RA. The row decoder 212 selects any block BLK in the memory cell array 211 based on a decode result. The row decoder 212 applies voltages to interconnects (a word line and a selection gate line explained below) in a row direction of the selected block BLK.

The sense amplifier 213 is a circuit that writes and reads the data DAT. The sense amplifier 213 is connected to the memory cell array 211. The sense amplifier 213 reads the data DAT from the memory cell array 211 in the read operation. In addition, the sense amplifier 213 supplies a voltage corresponding to the write data DAT to the memory cell array 211 in the write operation.

The data register 214 is a register that temporarily stores the data DAT. The data register 214 is connected to the sense amplifier 213. The data register 214 includes a plurality of latch circuits. The latch circuits temporarily store write data or read data.

The column decoder 215 is a circuit that decodes the column address CA. The column decoder 215 receives the column address CA from the address register 203. The column decoder 215 selects a latch circuit in the data register 214 based on a decode result of the column address CA.

1.1.4 Circuit Configuration of Memory Cell Array

Next, an example of a circuit configuration of the memory cell array 211 is explained with reference to FIG. 3. FIG. 3 illustrates a circuit configuration of one block BLK in one plane PLN.

The block BLK includes, for example, four string units SU0 to SU3. Note that the number of string units SU included in the block BLK is optional. The string unit SU is, for example, a set of a plurality of NAND strings NS collectively selected in a write operation or a read operation.

Next, an internal configuration of the string unit SU will be explained. The string unit SU includes a plurality of NAND strings NS. The NAND string NS is a set of a plurality of memory cell transistors connected in series. The plurality of NAND strings NS in the string unit SU are connected to any of bit lines BL0 to BL1 (i is an integer equal to or larger than 1).

Next, an internal configuration of the NAND string NS will be explained. Each of the NAND strings NS includes a plurality of memory cell transistors MC and selection transistors ST1 and ST2. In the example illustrated in FIG. 3, the NAND string NS includes eight memory cell transistors MC0 to MC7.

The memory cell transistor MC is a memory element that stores data in a nonvolatile manner. The memory cell transistor MC includes a control gate and a charge storage layer. The memory cell transistor MC may be a metal-oxide-nitride-oxide-silicon (MONOS) type or a floating gate (FG) type.

The selection transistors ST1 and ST2 are switching elements. The selection transistors ST1 and ST2 are respectively used to select the string units SU at various operation times.

The current paths of the selection transistor ST2, the memory cell transistors MC0 to MC7, and the selection transistor ST1 in the NAND string NS are connected in series. A drain of the selection transistor ST1 is connected to bit lines BL. A source of the selection transistor ST2 is connected to a source line SL.

Control gates of the memory cell transistors MC0 to MC7 in the same block BLK are respectively connected to the word lines WL0 to WL7 in common. More specifically, for example, the block BLK includes four string units SU0 to SU3. Each of the string units SU includes a plurality of memory cell transistors MC0. The control gates of the plurality of memory cell transistors MC0 in the block BLK are connected to one word line WL0 in common. The same applies to the memory cell transistors MC1 to MC7.

Gates of a plurality of selection transistors ST1 in the string unit SU are connected to one selection gate line SGD in common. More specifically, the gates of the plurality of selection transistors ST1 in the string unit SU0 are connected to a selection gate line SGD0 in common. Gates of the plurality of selection transistors ST1 in the string unit SU1 are connected to a selection gate line SGD1 in common. Gates of the plurality of selection transistors ST1 in the string unit SU2 are connected to a selection gate line SGD2 in common. Gates of the plurality of selection transistors ST1 in the string unit SU3 are connected to a selection gate line SGD3 in common.

Gates of a plurality of selection transistors ST2 in the block BLK are connected to a selection gate line SGS in common.

The word lines WL0 to WL7, the selection gate lines SGD0 to SGD3, and the selection gate line SGS are respectively connected to the row decoder 212 in the plane PLN.

The bit lines BL are connected to one NAND string NS in each of the string units SU of each of the blocks BLK in common. The bit lines BL are connected to the sense amplifier 213 in the plane PLN.

The source line SL is shared, for example, among a plurality of blocks BLK.

A set of the plurality of memory cell transistors MC connected to the common word line WL in one string unit SU is referred to as, for example, "cell unit CU". In other words, the cell unit CU is a set of the plurality of memory cell transistors MC collectively selected in the write operation or the read operation. For example, when the memory cell transistor MC stores 1-bit data, a storage capacity of the cell unit CU is defined as "one-page data". Therefore, a page is a unit of data that is collectively written in (collectively read from) the memory cell array 211. Note that the cell unit CU can have a storage capacity for two-page data or more based on the number of bits of data stored in the memory cell transistor MC.

For example, in the read operation of the memory chip 20, any one of the cell units CU is selected and data is read from the memory cell array 211 to the sense amplifier 213 in page units. The read data is stored in the data register 214. The data stored in the data register 214 is transmitted to the memory controller 10. Note that a size of data transmitted from the data register 214 to the memory controller 10 is not limited to a size corresponding to the one-page data (hereinafter referred to as a "page size" as well). For example, the memory controller 10 can read data smaller than the one-page data stored in the data register 214 by controlling an address of a data output start in the data register 214 and the size of data to be transmitted.

1.1.5 Memory Area of Memory Chip

Next, an example of a memory area of the memory chip 20 will be explained with reference to FIG. 4. FIG. 4 is a diagram illustrating an example of the memory area.

As illustrated in FIG. 4, the memory cell array 211 of each of the planes PLN includes a QoS data area 211a and an IOPS data area 211b as memory areas. The QoS data area 211a is an area in which page data having the QoS data structure (hereinafter referred to as "QoS page data") is stored. The IOPS data area 211b is an area in which page data having the IOPS data structure (hereinafter referred to as "IOPS page data") is stored. For example, any one of the blocks BLK in the memory cell array 211 is allocated to the QoS data area 211a and another block BLK is allocated to the IOPS data area 211b. Note that the allocation of the memory areas is not limited thereto. For example, the memory cell array 211 of any one of the planes PLN in the memory chip 20 may be allocated to the QoS data area 211a and the memory cell array 211 of another plane PLN may be allocated to the IOPS data area 211b.

1.2 Threshold Voltage Distribution of Memory Cell Transistor

Figure 5:
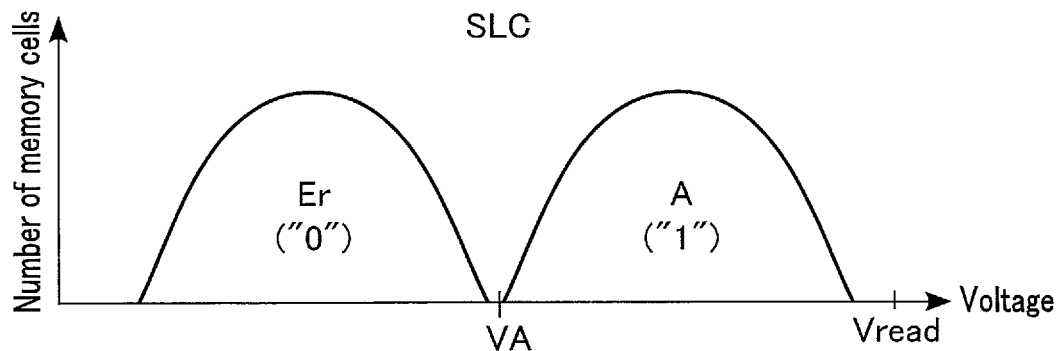
FIG. 5 is a diagram illustrating a threshold voltage distribution in a case where the memory cell transistor included in the memory system according to the first embodiment holds 1-bit data.
Figure 6:
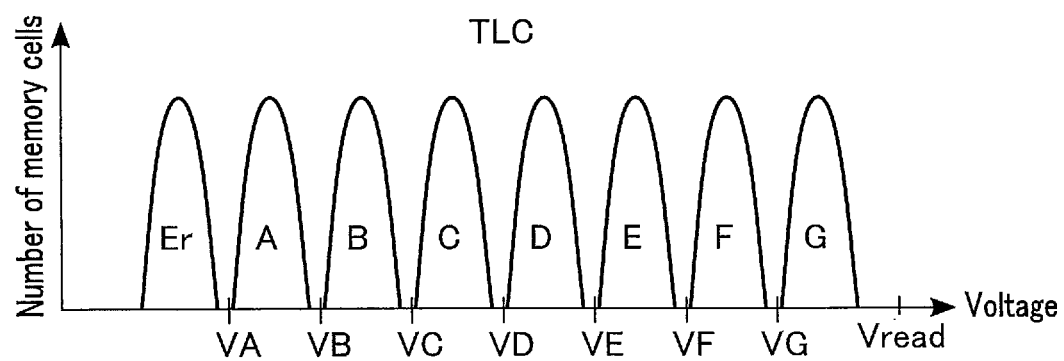
FIG. 6 is a diagram illustrating threshold voltage distribution and data allocation in a case where the memory cell transistor included in the memory system according to the first embodiment holds 3-bit data.

Next, an example of a threshold voltage distribution that can be taken by the memory cell transistor MC will be explained with reference to FIGS. 5 and 6. FIG. 5 is a diagram illustrating a threshold voltage distribution in a case where the memory cell transistor MC holds 1-bit data. FIG. 6 is a diagram illustrating a threshold voltage distribution and data allocation in a case where the memory cell transistor MC holds 3-bit data.

For example, when the latency of the read operation is compared between a case where the memory cell transistor MC is a single level cell (SLC) capable of holding binary (1-bit) data and a case where the memory cell transistor MC is a triple level cell (TLC) capable of holding octal (3-bit) data, the latency can be reduced more in the SLC. Therefore, in the present embodiment, for example, QoS page data is written in the SLC and LOPS page data is written in the TLC. Note that the memory cell transistor MC in which the QoS page data and the LOPS page data are written is not limited to this. The memory cell transistor MC only has to be capable of holding the binary (1-bit) data or larger data. For example, both of memory cell transistors MC in which the QoS page data and the IOPS page data are written may be SLCs or may be TLCs. In addition, the memory cell transistor MC may be a multi level cell (MLC) capable of holding quaternary (2-bit) data or may be a quad level cell (QLC).

As illustrated in FIG. 5, a threshold voltage of the SLC takes a value included in one of two discrete threshold distributions. Hereinafter, the two threshold distributions are respectively referred to as an "Er" state and an "A" state in ascending order.

The "Er" state corresponds to, for example, a data erase state. Then, the "A" state corresponds to a state in which charges are injected into the charge storage layer and data is written. In the write operation, a verify voltage corresponding to the threshold voltage distribution of the "A" state is represented as VA. Then, voltage values of a voltage V1 and a voltage Vread are in a relation of V1<Vread. The voltage Vread is a voltage applied to non-selected word lines WL at a read operation time. When the voltage Vread is applied to a gate of the memory cell transistor MC, the memory cell transistor MC is turned on irrespective of data held therein.

More specifically, the threshold voltage included in the "Er" state is lower than the voltage V1. The threshold voltage included in the "A" state is equal to or higher than the voltage V1 and lower than the voltage Vread.

For example, "0" data is allocated to the "Er" state and "1" data is allocated to the "A" data. Accordingly, the memory cell transistor MC holds binary data.

As illustrated in FIG. 6, in the case of the TLC, the threshold voltage of the memory cell transistor MC takes a value included in any one of discrete, for example, eight distributions. Hereinafter, the eight distributions are respectively referred to as an "Er" state, an "A" state, a "B" state, a "C" state, a "D" state, an "E" state, an "F" state, and a "G" state in ascending order of the threshold voltages.

The "Er" state corresponds to, for example, a data erase state. The "A" to "G" states correspond to a state in which charges are injected into the charge storage layer and data is written. In the write operation, verify voltages corresponding to the threshold voltage distributions are represented as VA to VG. Then, these voltage values are in a relation of VA<VB<VC<VD<VE<VF<VG<Vread.

More specifically, the threshold voltage included in the "Er" state is lower than the voltage VA. The threshold voltage included in the "A" state is equal to or higher than the voltage VA and lower than the voltage VB. The threshold voltage included in the "B" state is equal to or higher than the voltage VB and lower than the voltage VC. The threshold voltage included in the "C" state is equal to or higher than the voltage VC and lower than the voltage VD. The threshold voltage included in the "D" state is equal to or higher than the voltage VD and lower than the voltage VE. The threshold voltage included in the "E" state is equal to or higher than the voltage VE and lower than the voltage VF. The threshold voltage included in the "F" state is equal to or higher than the voltage VF and lower than the voltage VG. Then, the threshold voltage included in the "G" state is equal to or higher than the voltage VG and lower than the voltage Vread.

Since each of the memory cell transistors MC has any one of the eight threshold voltage distributions as explained above, the memory cell transistor MC can take eight kinds of states. By allocating these states to "000" to "111" in binary notation, each of memory cell transistors MC can hold 3-bit data. Hereinafter, the 3-bit data is respectively referred to as Lower bit, Middle bit, and Upper bit.In addition, a set of Lower bits collectively written in (or read from) to the cell unit CU is referred to as Lower page, a set of Middle bits collectively written in (or read from) to the cell unit CU is referred to as Middle page, and a set of Upper bits collectively written in (or read from) to the cell unit CU is referred to as Upper page.

In the example illustrated in FIG. 6, data is allocated to "Upper bit/Middle bit/Lower bit" for the memory cell transistor MC included in the threshold voltage distributions as follows.

"Er" state: "000" data
"A" state: "100" data
"B" state: "010" data
"C" state: "110" data
"D" state: "001" data
"E" state: "101" data
"F" state: "011" data
"G" state: "111" data In a case where the data allocated in this manner is read, the Lower bit is determined by the read operation of the "D" state. The Middle bit is determined by the read operation of the "B" state, the D "state, and the" F "state. The Upper bit is determined by the read operation of the "A" state, the "C" state, the "E" state, and the "G" state. That is, the values of the Lower bit, the Middle bit, and the Upper bit are respectively determined by one, three, and four read operations. In other words, the values of the Lower bit, the Middle bit, and the Upper bit are respectively determined by read operations of one, three, and four read levels. Hereinafter, such data allocation is referred to as "1-3-4 coding". Note that data allocation to the "Er" to "G" states is not limited to the 1-3-4 coding.

Note that, when the memory cell transistor MC is capable of holding two-bit data or larger data, the QoS page data and the IOPS page data may be written in one cell unit CU. In this case, the QoS page data is written in a page having a small read level for determining a value. More specifically, in the case of the cell unit CU corresponding to the 1-3-4 coding, the QoS page data is written in the Lower page in which data is determined in one read level. Then, IOPS page data is written in the Middle page and the Upper page.

1.3 Write Request

Next, the write request will be explained.

1.3.1 IOPS Data Structure

First, an example of an IOPS data structure will be explained with reference to FIG. 7. FIG. 7 is a diagram illustrating a flow of generation of IOPS page data. In the following explanation, in order to simplify the explanation, a case where IOPS page data does not include an erasure correction code is explained. Note that IOPS page data may include the erasure correction code.

As illustrated in FIG. 7, the data encoding circuit 40 (the memory system 3) divides user data D into, for example, a size corresponding to one-page data. One divided data is included in the one-page data. Note that the data size of the divided data is divided smaller than a one-page size because the divided data and the error correction code of the divided data are included in the one-page data. In the example illustrated FIG. 7, the data encoding circuit 40 divides the user data D into 4 KB four data $D_0$ to $D_3$.

Next, the data encoding circuit 40 generates an error correction code for each of the divided data $D_0$ to $D_3$. For example, a low density parity check (LDPC) code can be used as the error correction code. Note that the error correction code is not limited to the LDPC code. The data encoding circuit 40 adds corresponding error correction codes respectively to the divided data Do to $D_3$. As a result, the data encoding circuit 40 generates, for example, a data frame of one page size including the divided data Do and the given error correction code as IOPS page data. Therefore, in the case of the IOPS data structure, logical addresses of divided data in a page are continuous. The same applies to the divided data $D_1$ to $D_3$. For example, when the data size of the error correction code is represented as a, the data size of one page is 4 KB+α.

When the number of memory chips 20 in which the user data is written in a distributed manner is represented as n (n is an integer equal to or larger than 3), data frames of n page sizes are written in n memory chips 20 in a distributed manner. In the example illustrated in FIG. 7, the memory controller 10_0 writes IOPS page data including the divided data $D_0$ and the error correction code of the divided data $D_0$ in the IOPS data area 211b of the memory chip 20_0. The memory controller 10_1 writes IOPS page data including the divided data $D_1$ and the error correction code of the divided data $D_1$ in the IOPS data area 211b of the memory chip 20_1. The memory controller 10_2 writes IOPS page data including the divided data $D_2$ and the error correction code of the divided data $D_2$ in the IOPS data area 211b of the memory chip 20_2. The memory controller 10_3 writes IOPS page data including the divided data $D_3$ and the error correction code of the divided data $D_3$ in the IOPS data area 211b of the memory chip 20_3.

1.3.2 QoS Data Structure

Figure 8:
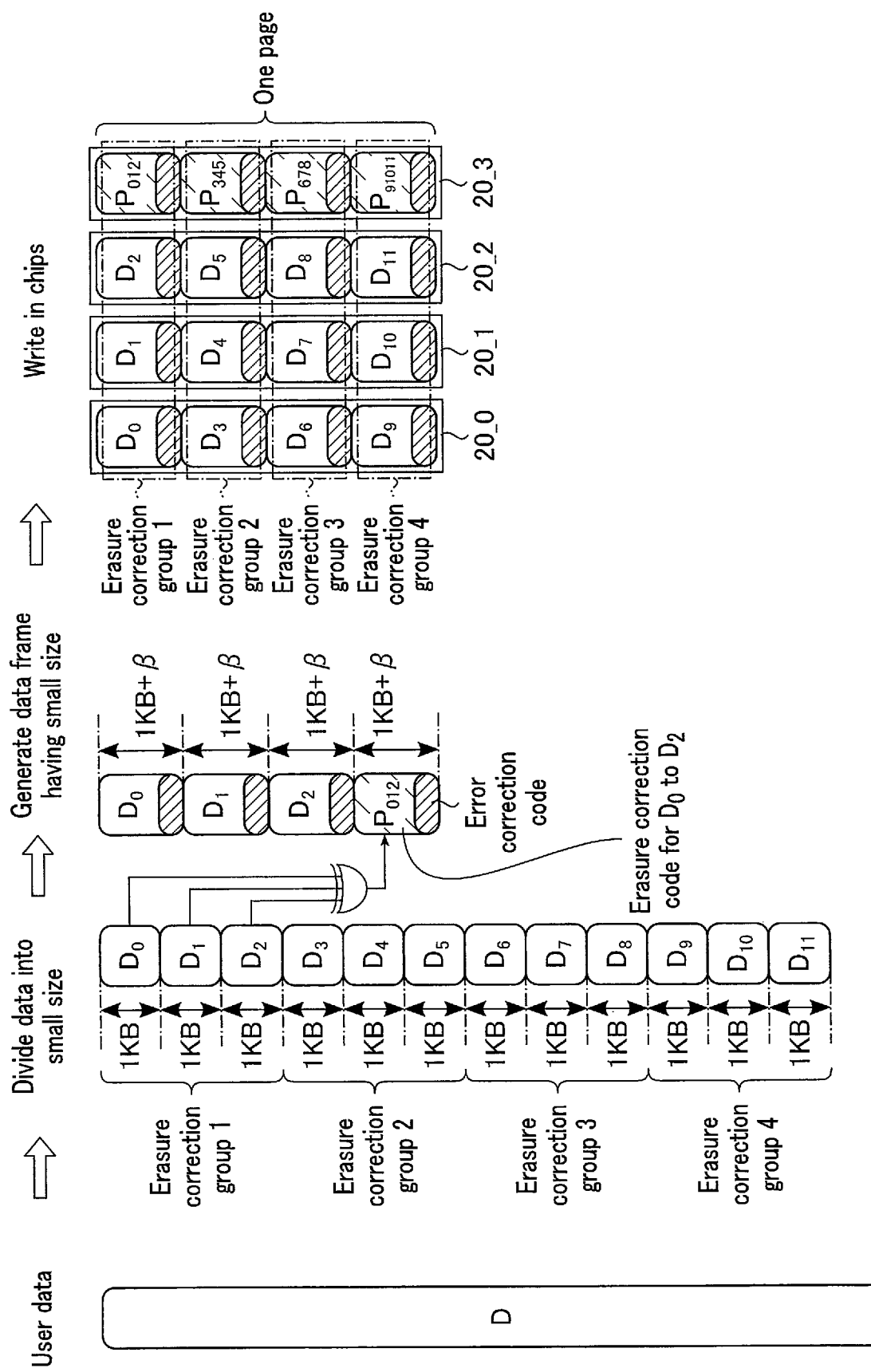
FIG. 8 is a diagram illustrating a flow of generating of QoS page data in the memory system according to the first embodiment.

Next, an example of the QoS data structure will be explained with reference to FIG. 8. FIG. 8 is a diagram illustrating a flow of generating of QoS page data.

As illustrated in FIG. 8, the data encoding circuit 40 (the memory system 3) divides the user data D into a size smaller than a page size, at least two or more of the sizes being included in the page size, (hereinafter referred to as a "small size"). Accordingly, a plurality of divided data of the small size are included in the one-page data. In the example illustrated in FIG. 8, the data encoding circuit 40 divides the user data D into 1 KB twelve data $D_0$ to $D_{11}$.

Next, the data encoding circuit 40 generates, for example, an erasure correction group including a plurality of divided data having continuous logical addresses. The erasure correction group is a group of a plurality of divided data having continuous logical addresses and erasure correction codes corresponding to the plurality of divided data. For example, when the number of divided data that can be collectively decoded by erasure correction decoding processing is m (m is an integer smaller than n), the erasure correction group includes (n-m) divided data and m erasure correction codes. More specifically, for example, in a case where the number of memory chips 20 is four (n=4) and the number of decodable divided data is one (m=1), the erasure correction group includes three divided data and one erasure correction code. In the example illustrated in FIG. 8, three divided data $D_0$ to $D_2$ are included in an erasure correction group 1. The divided data $D_3$ to $D_5$ are included in an erasure correction group 2. The divided data $D_6$ to $D_8$ are included in an erasure correction group 3. The divided data $D_9$ to $D_{11}$ are included in an erasure correction group 4.

Subsequently, the data encoding circuit 40 generates an erasure correction code. For example, the data encoding circuit 40 executes an exclusive OR operation (XOR) using bits of the divided data $D_0$ to $D_2$ of the erasure correction group 1 to generate an erasure correction code $P_{012}$. More specifically, for example, the data encoding circuit 40 executes an exclusive OR operation of a first bit of each of the divided data Do to $D_2$ to generate a first bit of the erasure correction code $P_{012}$. The same applies to the other bits. Therefore, a data size of the erasure correction code $P_{012}$ is the same as a data size of the divided data $D_0$ to $D_2$. Similarly, the data encoding circuit 40 generates erasure correction codes $P_{345}$, $P_{678}$, and $P_{91011}$ respectively in the erasure correction groups 2 to 4.

Next, the data encoding circuit 40 generates an error correction code for each of the divided data $D_0$ to $D_{11}$ and the erasure correction codes $P_{012}$, $P_{345}$, $P_{678}$, and $P_{91011}$. As the error correction code, for example, a BCH code can be used. Note that the error correction code is not limited to the BCH code. The data encoding circuit 40 adds corresponding error correction codes respectively to the divided data $D_0$ to $D_{11}$ and the erasure correction codes $P_{012}$, $P_{345}$, $P_{678}$, and $P_{91011}$. Accordingly, the data encoding circuit 40 generates, for example, a small-size data frame including the divided data $D_0$ and the corresponding error correction code. The same applies to the divided data $D_0$ to $D_{11}$ and the erasure correction codes $P_{012}$, $P_{345}$, $P_{678}$, and $P_{91011}$. Therefore, each of the erasure correction groups includes, for example, a small-size data frame of three divided data and a small-size data frame of one erasure correction code. For example, a data size of one erasure correction group can correspond to the one-page data. In the example illustrated in FIG. 8, when the data size of the error correction code is represented as β, the data size of one page is 4 KB+4β. Note that the data size of the erasure correction group need not be the same as the size of the one-page data. The data size of the erasure correction group may be smaller or larger than one-page data.

The n small-size data frames of one erasure correction group are arranged on n memory chips 20 in a distributed manner. The data encoding circuit 40 generates, for example, one-page data including one small-size data frame of each of a continuous plurality of erasure correction groups as QoS page data. Therefore, in the case of the QoS data structure, logical addresses of a plurality of divided data in a page are not continuous. For example, the memory controller 10_0 collectively writes, in the QoS data area 211a of the memory chip 20_0, QoS page data including a data frame including the divided data $D_0$ of the erasure correction group 1, a data frame including the divided data $D_3$ of the erasure correction group 2, a data frame including the divided data $D_6$ of the erasure correction group 3, and a data frame including the divided data $D_9$ of the erasure correction group 4. The memory controller 10_1 collectively writes, in the QoS data area 211a of the memory chip 20_1, QoS page data including a data frame including the divided data $D_1$ of the erasure correction group 1, a data frame including the divided data $D_4$ of the erasure correction group 2, a data frame including the divided data $D_7$ of the erasure correction group 3, and a data frame including the divided data $D_{10}$ of the erasure correction group 4. The memory controller 10_2 collectively writes, in the QoS data area 211a of the memory chip 20_2, QoS page data including a data frame including the divided data $D_2$ of the erasure correction group 1, a data frame including the divided data $D_5$ of the erasure correction group 2, a data frame including the divided data $D_5$ of the erasure correction group 3, and a data frame including the divided data $D_{11}$ of the erasure correction group 4. The memory controller 10_3 collectively writes, in the QoS data area 211a of the memory chip 20_3, QoS page data including a data frame including the erasure correction code $P_{012}$ of the erasure correction group 1, a data frame including the erasure correction code $P_{345}$ of the erasure correction group 2, a data frame including the erasure correction code $P_{678}$ of the erasure correction group 3, and a data frame including the erasure correction code $P_{91011}$ of the erasure correction group 4.

In the case of a QoS data structure corresponding to two memory chips 20, data mirroring (simple copy of original data) can be generated as the erasure correction code. The original data and the erasure correction code are respectively written in the two memory chips 20. When the memory chip 20 storing the original data is in a busy state, the erasure correction code (copy data) is read from the memory chip 20 storing the erasure correction code (the copy data).

1.3.3 Flow of Write Request

Next, an example of a flow of a write request is explained with reference to FIG. 9. FIG. 9 is a flowchart of the write request.

As illustrated in FIG. 9, the memory system 3 receives a write request from the host device 2. When the write request is a write request for QoS page data (step S101_Yes), the data encoding circuit 40 divides user data into a small size (step S102).

The data encoding circuit 40 generates an erasure correction group including (n-1) small-size divided data having continuous logical addresses (step S103).

The data encoding circuit 40 generates an erasure correction code for each of the erasure correction groups (step S104).

The data encoding circuit 40 adds an error correction codes to each of the divided data and the erasure correction code to generate a small-size data frame (step S105).

The data encoding circuit 40 arranges a plurality of continuous erasure correction groups in the n memory chips 20 in a distributed manner (step S106). More specifically, the data encoding circuit 40 arranges n small-size data frames of each of the erasure correction groups in n memory chips in a distributed manner. Accordingly, each of the plurality of erasure correction groups is arranged in the n memory chips 20 in a distributed manner. That is, the data encoding circuit 40 generates n QoS page data including a plurality of small-size data frames. The n QoS page data are respectively transmitted to the n memory controllers 10 corresponding thereto.

On the other hand, when the write request is not a write request for QoS page data (step S101_No), the data encoding circuit 40 divides the user data into a data size corresponding to the page size (step S107).

The data encoding circuit 40 adds an error correction code to each of the divided data to generate n page-size data frames (step S108).

The data encoding circuit 40 arranges the n page-size data frames in the n memory chips 20 in a distributed manner (step S109). That is, the n LOPS page data are respectively transmitted to the n memory controllers 10 corresponding thereto.

When the number of write requests stored in the write request FIFO 110 is equal to or smaller than a preset threshold (step S110_No), the command flow control circuit 150 executes scheduling control while limiting the number of times of simultaneous write processing (step S111). That is, the n memory controllers 10 corresponding to the n memory chips 20 execute scheduling control of mutual write operation execution timings in a state in which the number of write operations that can be simultaneously executed is limited. For example, when data of one memory chip 20 can be decoded by the erasure correction decoding processing, the command flow control circuits 150 of the n memory controllers 10 execute scheduling control so that the write operations of the memory controllers 10 are executed in order one by one.

On the other hand, when the number of write requests stored in the write request FIFO 110 is larger than the preset threshold (step S110_Yes), the command flow control circuit 150 does not limit the number of times of simultaneous write processing (step S112). For example, when requests from the host device 2 are concentrated on write requests, the memory system 3 can preferentially execute the write operation. In this case, the n memory chips 20 may simultaneously execute the write operations.

The memory chip 20 enabled to execute the write operation by the command flow control circuit 150 executes the write operation (step S113).

1.3.4 Transmission and Reception of Information and the Like in Write Request

Figure 10:
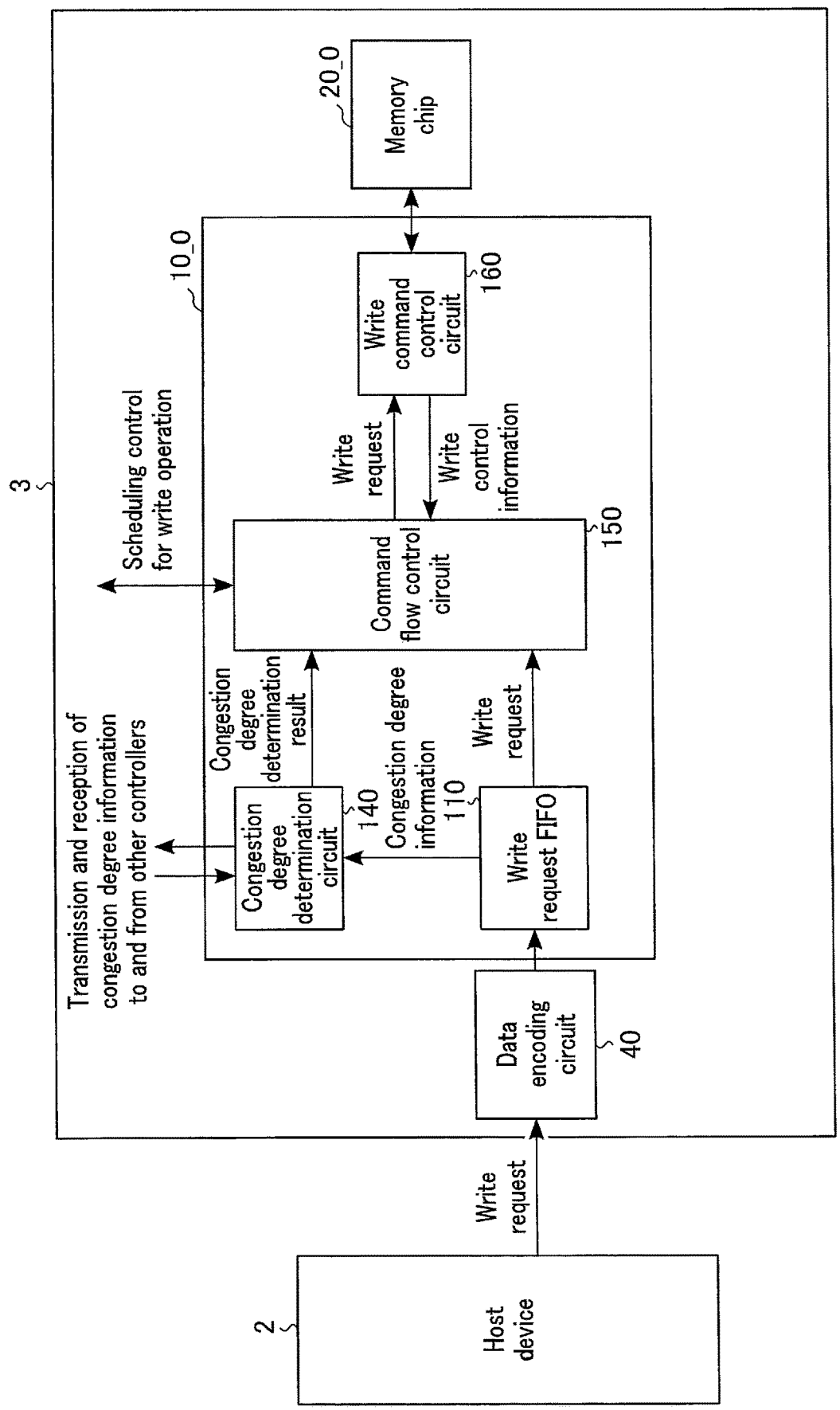
FIG. 10 is a diagram illustrating transmission and reception of information and the like in a write request in the memory system according to the first embodiment.

Next, an example of transmission and reception of information and the like in a write request is explained with reference to FIG. 10. FIG. 10 is a diagram illustrating transmission and reception of information and the like in a write request. In order to simplify the explanation, the example illustrated in FIG. 10 illustrates a case where the write request is transmitted to the memory controller 10_0 and the other memory controllers 10_1 to 10_3 are omitted. Description of a read request is omitted.

As illustrated in FIG. 10, a write request including user data is transmitted from the host device 2 to the memory system 3. The data encoding circuit 40 generates write data based on the user data. Write requests including the write data are stored in the write request FIFO 110 of the memory controller 10_0. The write request FIFO 110 transmits the write requests to the command flow control circuit 150 in order in which the write requests are input.

The congestion degree determination circuit 140 receives, from the write request FIFO 110, congestion degree information based on the number of write requests stored in the write request FIFO 110. In addition, the congestion degree determination circuit 140 receives congestion degree information of the other memory controllers 10. The congestion degree determination circuit 140 determines a congestion degree from the received congestion degree information of the memory controllers 10. The congestion degree determination circuit 140 transmits a congestion degree determination result to command flow control circuit 150.

Upon receiving the write request, the command flow control circuit 150 determines, based on the congestion degree determination result, whether to perform scheduling control of the write operation with the other memory controllers 10. When performing the scheduling control, the command flow control circuit 150 performs schedule adjustment of the write operation with the other memory controllers 10.

When determining that the write operation is executable, the command flow control circuit 150 transmits a write request to the write command control circuit 160. The write command control circuit 160 issues a write command to the memory chip 20_0 and transmits the write command to the memory chip 20_0.

When executing the write operation in the memory chip 20_0, the command flow control circuit 150 can receive the write control information from the write command control circuit 160.

1.4 Read Request

Next, a read request will be explained.

1.4.1 IOPS Read Request

First, an example of an IOPS read request is explained with reference to FIG. 11. FIG. 11 is a diagram illustrating a flow of data in the IOPS read request. Note that, in the example illustrated in FIG. 11, in order to simplify the explanation, description of an error correction code is omitted. In addition, in the example of FIG. 11, a case where the divided data $D_0$ to $D_3$ is explained.

As illustrated in FIG. 11, when the memory system 3 receives an IOPS read request from the host device 2, the memory controllers 10 execute an IOPS read operation in the memory chips 20 corresponding thereto. More specifically, the memory chips 20_0 to 20_3 execute the read operation of a data frame of one page size respectively including the divided data $D_0$ to D 3. In each of the memory chips 20, one-page data read from the memory cell array 211 is stored in the data register 214.

In the case of the IOPS read operation, the memory chip 20 transmits the one-page data stored in the data register 214 to the memory controller 10 corresponding thereto. More specifically, one-page data including the divided data $D_0$ is transmitted to the memory controller 100. One-page data including the divided data $D_1$ is transmitted to the memory controller 10_1. One-page data including the divided data $D_2$ is transmitted to the memory controller 10_2. One-page data including the divided data $D_3$ is transmitted to the memory controller 10_3.

The divided data $D_0$ to $D_3$ are output to the host device 2 as read data after the ECC processing.

1.4.2 QoS Read Request

Figure 12:
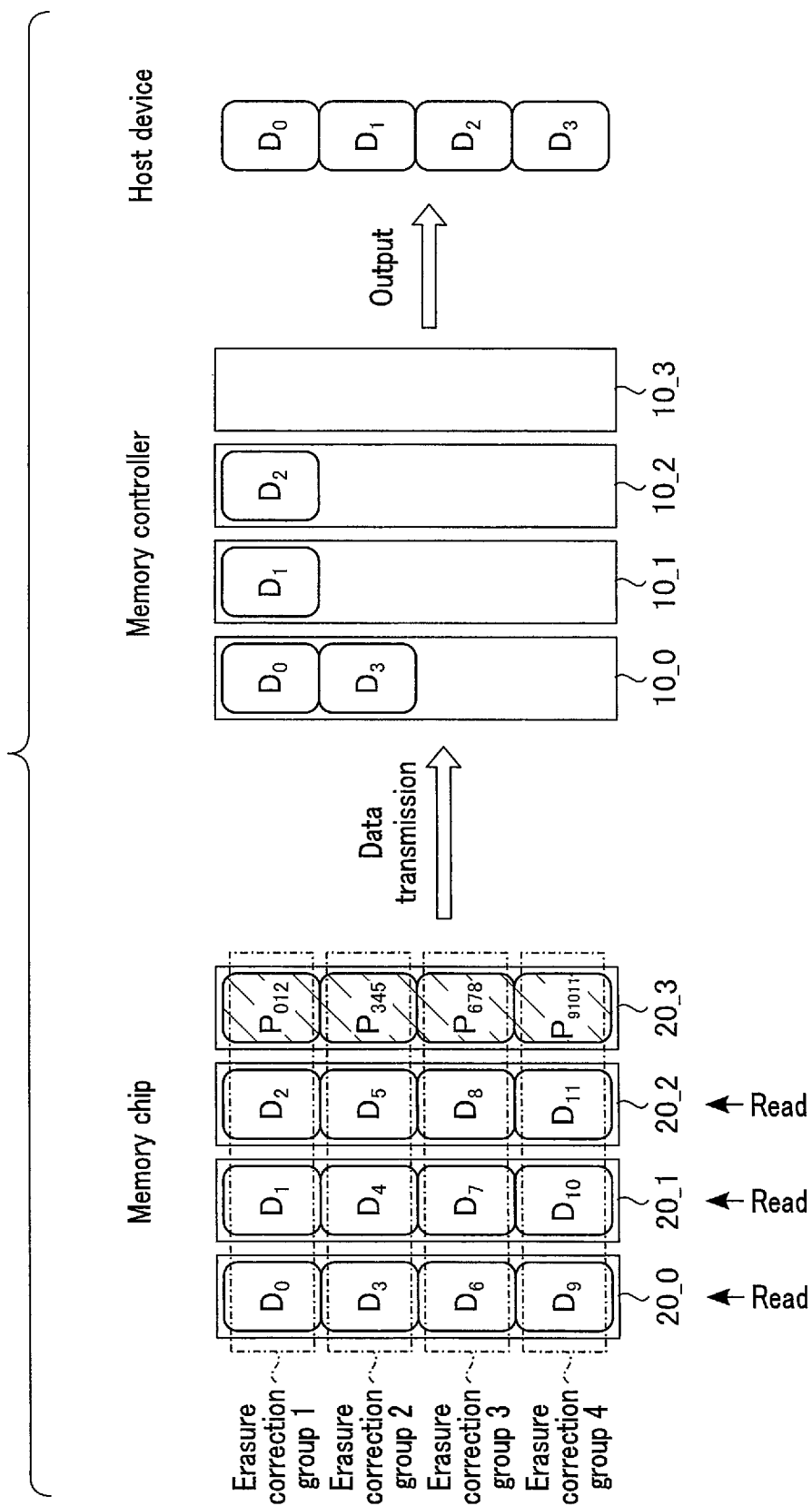
FIG. 12 is a diagram illustrating a flow of data in a QoS read request in the memory system according to the first embodiment.
Figure 13:
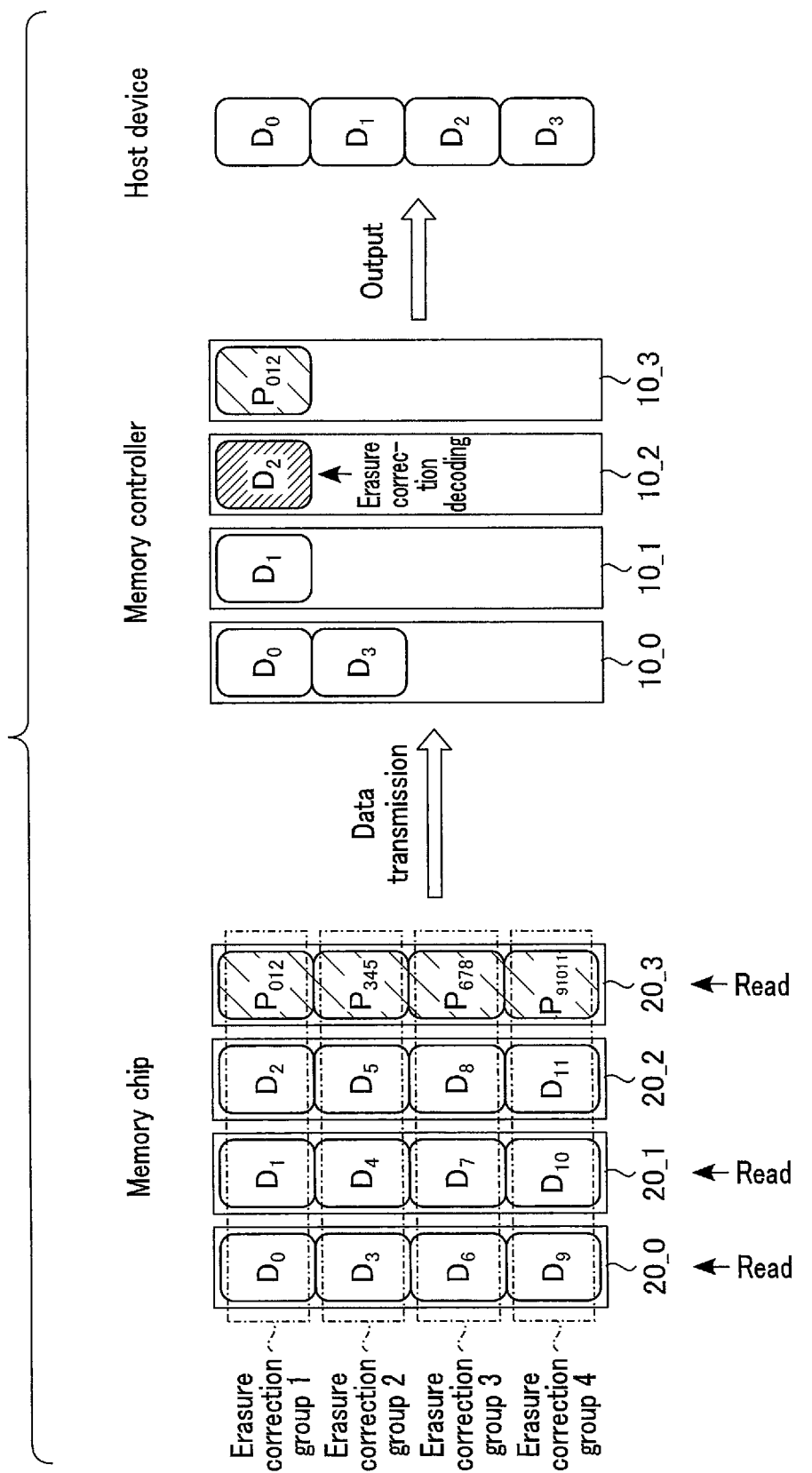
FIG. 13 is a diagram illustrating a flow of data in a QoS read request in the memory system according to the first embodiment.
Figure 14:
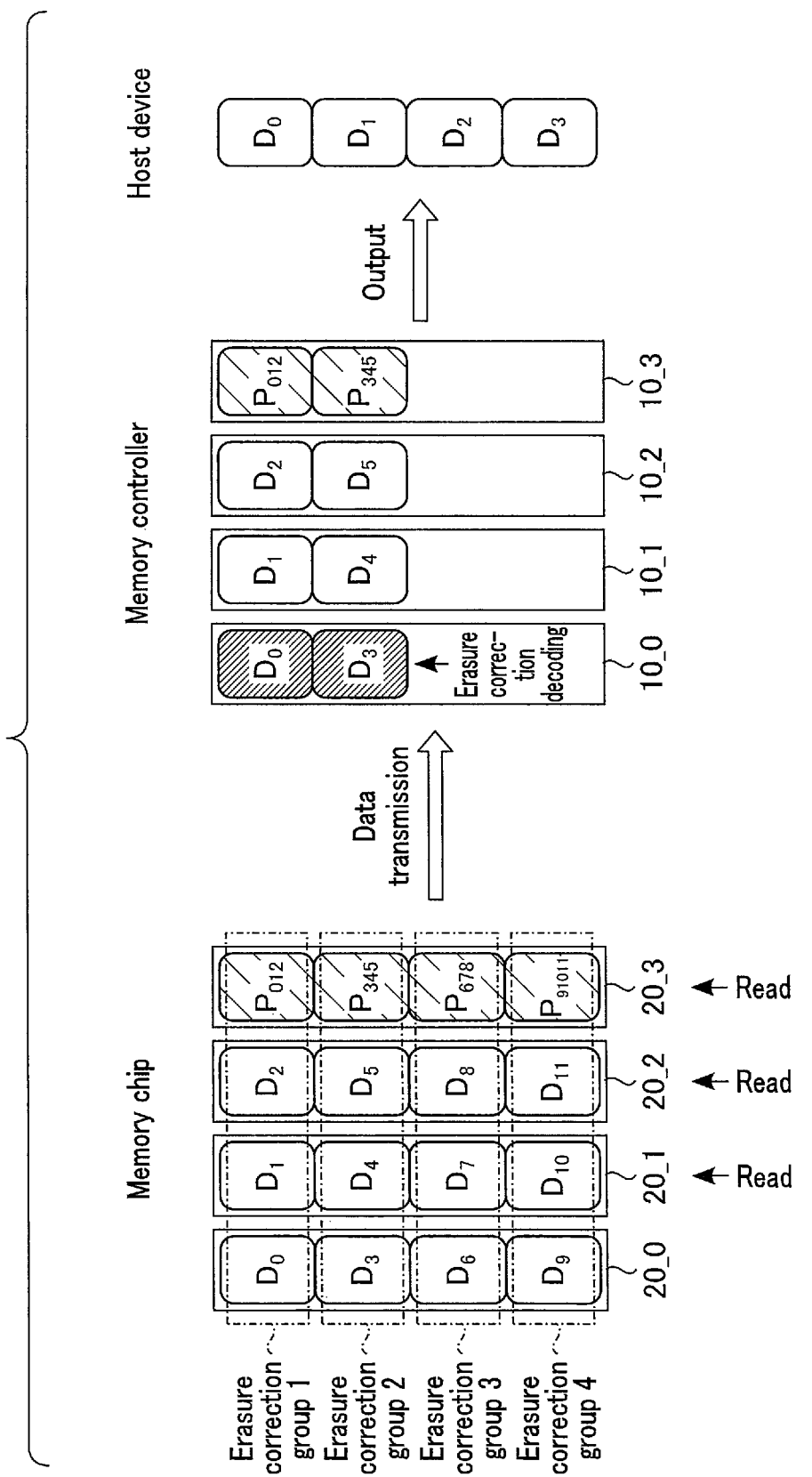
FIG. 14 is a diagram illustrating a flow of data in a QoS read request in the memory system according to the first embodiment.

Next, an example of the QoS read request will be explained with reference to FIGS. 12 to 14. FIGS. 12 to 14 are diagrams illustrating a flow of data in the QoS read request. Note that, in the example illustrated in FIGS. 12 to 14, in order to simplify the explanation, description of an error correction code is omitted. In addition, in the example illustrated in FIGS. 12 to 14, a case where the divided data $D_0$ to $D_3$ having continuous logical addresses are read is explained.

In the case of the QoS read request, data to be transmitted from the data register 214 of the memory chip to the memory controller 10 is different depending on the presence or absence of the erasure correction decoding processing.

First, a case where the erasure correction decoding processing is unnecessary is explained with reference to FIG. 12. The memory chips 20_0, 20_1, and 20_2 storing the divided data $D_0$ to $D_3$ are in a ready state. Therefore, the QoS read operation is executed in the memory chips 20_0, 20_1, and 20_2. More specifically, the memory chip 20_0 reads one-page data including the divided data $D_0$, $D_3$, $D_6$, and $D_9$ from the memory cell array 211 and stores the one-page data in the data register 214. The memory chip 20_1 reads one-page data including the divided data $D_1$, $D_4$, $D_7$, and $D_{10}$ from the memory cell array 211 and stores the one-page data in the data register 214. The memory chip 20_2 reads one-page data including the divided data $D_2$, $D_5$, $D_8$, and $D_{11}$ from the memory cell array 211 and stores the one-page data in the data register 214.

In the case of the QoS read operation, the memory chip 20 transmits a small-size data frame corresponding to the QoS read request among the one-page data stored in the data register 214 to the memory controller 10 corresponding thereto. More specifically, the memory chip 20_0 transmits a small-size data frame including the divided data $D_0$ and a small-size data frame including the divided data $D_3$ to the memory controller 10_0. The memory chip 20_1 transmits a small-size data frame including the divided data $D_1$ to the memory controller 10_1. The memory chip 202 transmits a small-size data frame including the divided data $D_2$ to the memory controller 10_2.

The divided data $D_0$ to $D_3$ are output to the host device 2 as read data after the ECC processing.

Next, a case where the erasure correction decoding processing of the divided data $D_2$ is executed will be explained with reference to FIG. 13. The example illustrated in FIG. 13 illustrates a case where the memory chip 20_2 is, for example, in a busy state.

In the case of the QoS read operation, when there is the memory chip 20 in a busy state, the memory system 3 decodes read data through the erasure correction decoding processing without executing the read operation of the memory chip 20 in order to reduce the latency. More specifically, for example, when the memory chip 20_2 is in a busy state, the memory controller 10_2 transmits a read request for the erasure correction group 1 in which the divided data $D_2$ to be read belongs to the other memory controllers 10_0, 10_1, and 10_3 corresponding to the other chips (hereinafter referred to as "other chips belonging to the same erasure correction group" as well) storing other data of the erasure correction group to which the data to be read belongs. As a result, the memory chip 20_0 reads one-page data including the divided data Do, $D_3$, $D_6$, and $D_9$ from the memory cell array 211 and stores the one-page data in the data register 214. The memory chip 20_1 reads one-page data including the divided data $D_1$, $D_4$, $D_7$, and $D_{10}$ from the memory cell array 211 and stores the one-page data in the data register 214. The memory chip 20_3 reads one-page data including the erasure correction codes $P_{012}$, $P_{345}$, $P_{678}$, and $P_{91011}$ from the memory cell array 211 and stores the one-page data in the data register 214.

Next, the memory chip 20_0 transmits a small-size data frame including the divided data $D_0$ and a small-size data frame including the divided data $D_3$ to the memory controller 10_0. The memory chip 20_1 transmits a small-size data frame including the divided data $D_1$ to the memory controller 10_1. The memory chip 20_3 transmits a small-size data frame including the erasure correction code $P_{012}$ to the memory controller 10_3.

Next, the correction decoding circuit 180 of the memory controller 10_0 executes the ECC processing for the divided data $D_0$ and $D_3$. The correction decoding circuit 180 of the memory controller 10_1 executes the ECC processing for the divided data $D_1$. The correction decoding circuit 180 of the memory controller 10_3 executes the ECC processing of the erasure correction code $P_{012}$.

The correction decoding circuit 180 of the memory controller 10_2 receives the divided data $D_0$ and $D_1$ after the ECC processing and the erasure correction code Pole after the ECC processing from the other memory controllers 10_0, 10_1, and 103. Then, the correction decoding circuit 180 of the memory controller 10_2 decodes the divided data $D_2$ by the erasure correction decoding processing.

The divided data $D_0$ to $D_3$ are output to the host device 2 as read data.

Note that, when the memory chip 20_1 is in a busy state, the correction decoding circuit 180 of the memory controller 10_1 decodes the divided data $D_1$ through the erasure correction decoding processing using the divided data $D_0$ and $D_2$ and $P_{012}$.

Next, a case where the erasure correction decoding processing of the divided data $D_0$ and $D_3$ is executed is explained with reference to FIG. 14. The example illustrated in FIG. 14 illustrates a case where the memory chip 20_0 is in a busy state.

For example, in a case where the memory chip 20_0 is in the busy state, the memory controller 10_0 transmits, to the other memory controllers 10_1, 10_2, and 10_3, a read request for the erasure correction groups 1 and 2 to which the divided data $D_0$ and $D_3$ to be read belong. As a result, the memory chip 20_1 reads one-page data including the divided data $D_1$, $D_4$, $D_7$, and $D_{10}$ from the memory cell array 211 and stores the one-page data in the data register 214. The memory chip 20_2 reads one-page data including the divided data $D_2$, $D_5$, $D_8$, and $D_{11}$ from the memory cell array 211 and stores the one-page data in the data register 214. The memory chip 20_3 reads one-page data including the erasure correction codes $P_{012}$, $P_{345}$, $P_{678}$, and $P_{91011}$ from the memory cell array 211 and stores the one-page data in the data register 214.

Next, the memory chip 20_1 transmits two small-size data frames respectively including the divided data $D_1$ and $D_4$ to the memory controller 10_1. The memory chip 20_2 transmits two small-size data frames respectively including the divided data $D_2$ and $D_5$ to the memory controller 10_2. The memory chip 20_3 transmits two small-size data frames respectively including erasure correction codes $P_{012}$ and $P_{345}$ to the memory controller 10_3.

Next, the correction decoding circuit 180 of the memory controller 10_1 executes the ECC processing for the divided data $D_1$ and $D_4$. The correction decoding circuit 180 of the memory controller 10_1 executes the ECC processing for the divided data $D_2$ and $D_5$. The correction decoding circuit 180 of the memory controller 10_3 executes the ECC processing of the erasure correction codes $P_{012}$ and $P_{345}$.

The correction decoding circuit 180 of the memory controller 10_0 receives the divided data $D_1$, $D_2$, $D_4$, and $D_5$ after the ECC processing and the erasure correction codes $P_{012}$ and $P_{345}$ after the ECC processing from the memory controllers 10_1, 10_2, and 10_3. Then, the correction decoding circuit 180 of the memory controller 10_0 decodes the divided data $D_0$ and $D_3$ by the erasure correction decoding processing.

The divided data $D_0$ to $D_3$ are output to the host device 2 as read data.

1.4.3 Flow of Read Request

Figure 15:
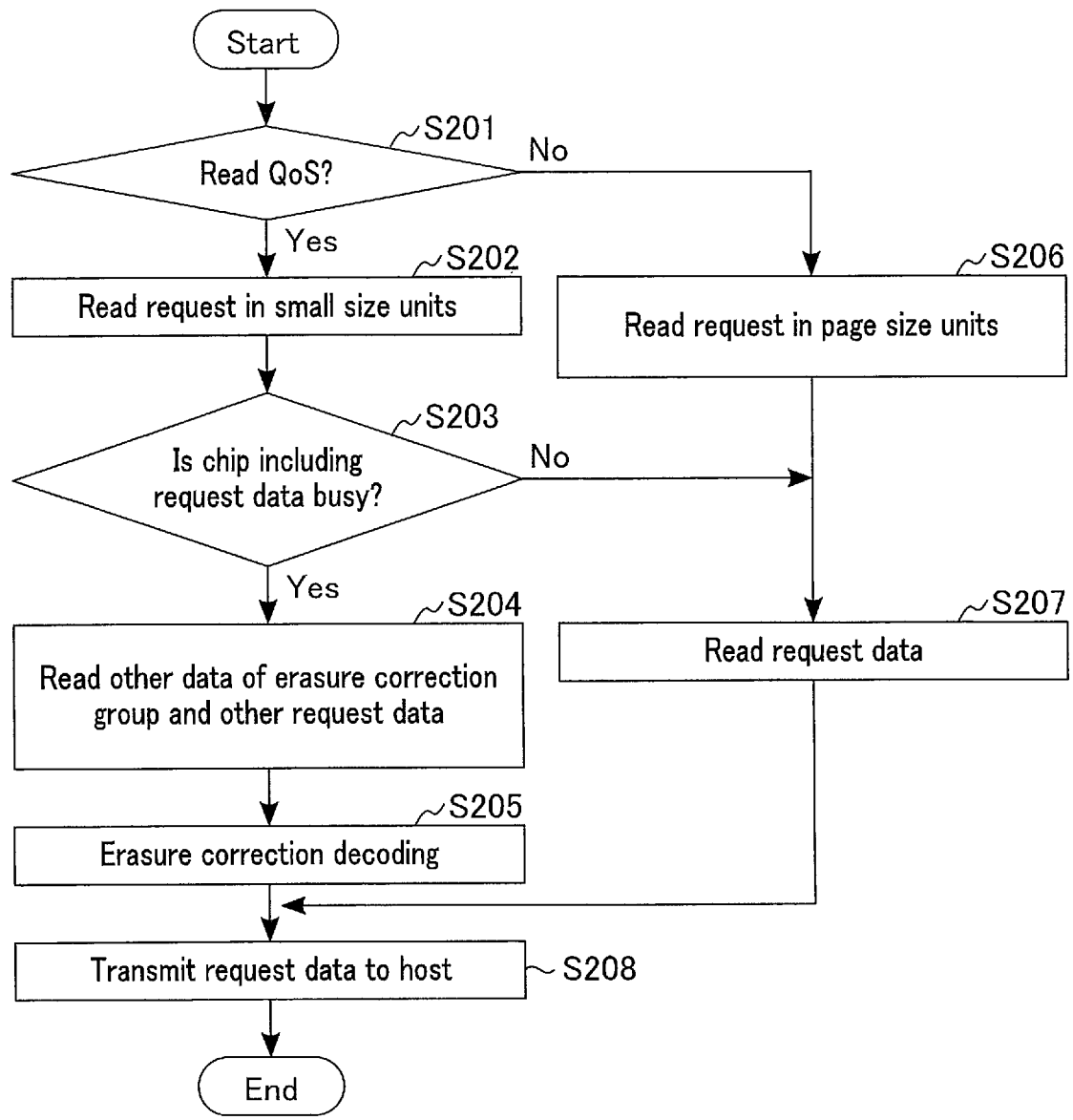
FIG. 15 is a flowchart of a read request in the memory system according to the first embodiment.

Next, an example of a flow of a read request is explained with reference to FIG. 15. FIG. 15 is a flowchart of the read request.

As illustrated in FIG. 15, the memory system 3 receives a read request from the host device 2. When the read request is a QoS read request (step S201_Yes), the read request determination circuit 30 issues a plurality of QoS read requests corresponding to the divided data in small size units having continuous logical addresses (step S202). Then, the read request determination circuit transmits QoS read requests respectively to the QoS read request FIFOs 120 of the plurality of memory controllers 10 corresponding thereto. Note that the host device 2 may issue a plurality of QoS read requests in small size units. In this case, the read request determination circuit 30 transmits the received plurality of read requests to the plurality of memory controllers corresponding thereto.

On the other hand, when the read request is not a QoS read request (step S201_No), that is, when the read request is an LOPS read request, the read request determination circuit 30 issues a plurality of IOPS read requests corresponding to divided data in page size units (step S206). The read request determination circuit 30 transmits LOPS read requests respectively to the LOPS read request FIFOs 130 of the plurality of memory controllers 10 corresponding thereto. Note that the host device 2 may issue a plurality of read requests in page size units.

The memory controller 10 receiving the QoS read request in the QoS read request FIFO 120 checks whether the memory chip 20 including the request data is in a busy state (step S203).

When the memory chip 20 including the request data is in the busy state (step S203 Yes), the memory controller 10 corresponding to the memory chip 20 in the busy state transmits, to the other memory controllers 10, a read request for other data of an erasure correction group to which the request data belongs. The other memory controller 10 reads other data of the erasure correction group and other request data from the memory chip 20 corresponding thereto (step S204).

Next, the memory controller 10 corresponding to the memory chip 20 in the busy state executes erasure correction decoding processing using other data of the erasure correction group and decodes request data (step S205).

On the other hand, in a case where the memory chip including the request data is not in the busy state (step S203 No) or in a case of an LOPS read request in page size units (step S206), the memory controller 10 reads the request data from the corresponding memory chip (step S207).

The memory system 3 transmits the request data to the host device 2 (step S208).

1.4.4 Transmission and Reception of Information and the Like in Read Request

Figure 16:
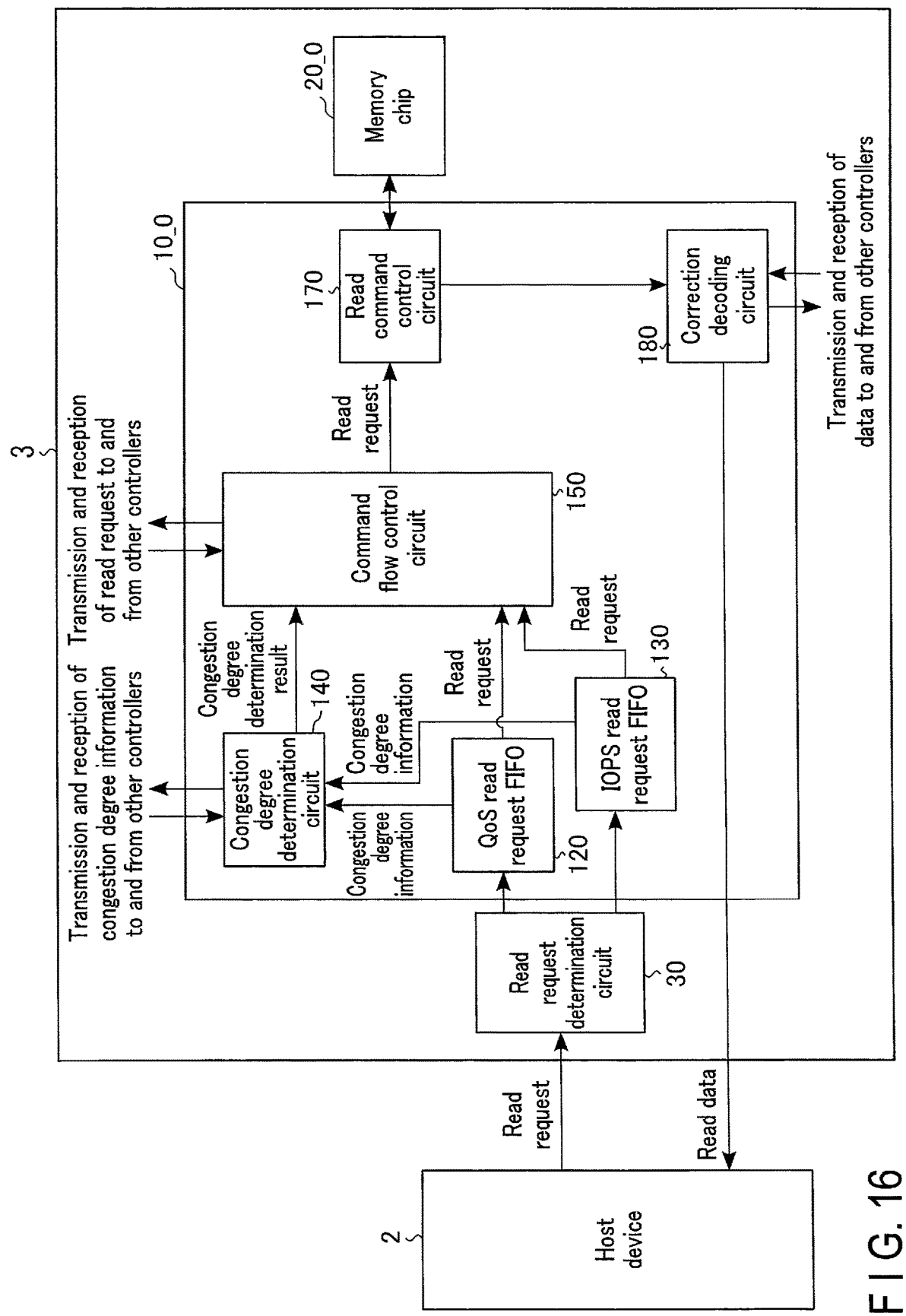
FIG. 16 is a diagram illustrating transmission and reception of information and the like in a read request in the memory system according to the first embodiment.

Next, an example of transmission and reception of information and the like in a read request will be explained with reference to FIG. 16. FIG. 16 is a diagram illustrating transmission and reception of information and the like in a read request. In order to simplify the explanation, the example illustrated in FIG. 16 illustrates a case where the read request is transmitted to the memory controller 10_0 and the other memory controllers 10_1 to 10_3 are omitted. Explanation is omitted about a write request.

As illustrated in FIG. 16, the read request is transmitted from the host device 2 to the memory system 3. When the read request is a request for a QoS read operation, the read request determination circuit 30 of the memory system 3 transmits the read request to the QoS read request FIFO 120 of the memory controller 10_0 corresponding thereto. In addition, when the read request is a request for an IOPS read operation, the read request determination circuit 30 transmits the read request to the IOPS read request FIFO 130 of the memory controller 10_0 corresponding thereto. The QoS read request FIFO 120 or the IOPS read request FIFO 130 transmits read requests to the command flow control circuit 150 in order in which the read requests are input.

The congestion degree determination circuit 140 receives congestion degree information from the QoS read request FIFO 120 and the IOPS read request FIFO 130. In addition, the congestion degree determination circuit 140 receives congestion degree information of the other memory controllers 10. The congestion degree determination circuit 140 determines a congestion degree from the received congestion degree information of the memory controllers 10. The congestion degree determination circuit 140 transmits a congestion degree determination result to command flow control circuit 150.

The command flow control circuit 150 receives a read request from the QoS read request FIFO 120, the IOPS read request FIFO 130, or the command flow control circuits 150 of the other memory controllers 10. When the own chip 20_0 is in the ready state, the command flow control circuit 150 transmits a read request to the read command control circuit 170. The read command control circuit 170 instructs the memory chip 20_0 to execute a read operation. Then, in the case of the QoS read operation, the read command control circuit 170 reads a small-size data frame to be read from the data register 214 of the memory chip 20_0. In addition, in the case of the IOPS read operation, the read command control circuit 170 reads, from the data register 214 of the memory chip 20_0, a data frame of one-page size to be read.

The read command control circuit 170 transmits data of the own chip 20_0 to the correction decoding circuit 180. The correction decoding circuit 180 executes the ECC processing for the data of the own chip 20_0. In a case where the data of the memory chip 20_0 is read based on a read request supplied from the QoS read request FIFO 120 or the IOPS read request FIFO 130, the correction decoding circuit 180 transmits the data after the ECC processing to the host device 2. On the other hand, when the data of the memory chip 20_0 is read based on a read request supplied from the other memory controllers 10, the correction decoding circuit 180 transmits the data after the ECC processing to the other memory controller 10 that has transmitted the read request.

In addition, for example, when the memory chip 20_0 is in a busy state in the QoS read operation, the command flow control circuit 150 selects decoding of read target data by the erasure correction decoding processing without selecting the read operation. Therefore, the command flow control circuit 150 transmits a read request to the other memory controllers 10 corresponding thereto in order to acquire other data of an erasure correction group to which the read target data belongs. In this case, the correction decoding circuit 180 performs erasure correction decoding processing based on the data of the other memory chip 20. Then, the correction decoding circuit 180 transmits the decoded data to the host device 2.

1.5 Priority Control

Figure 17:
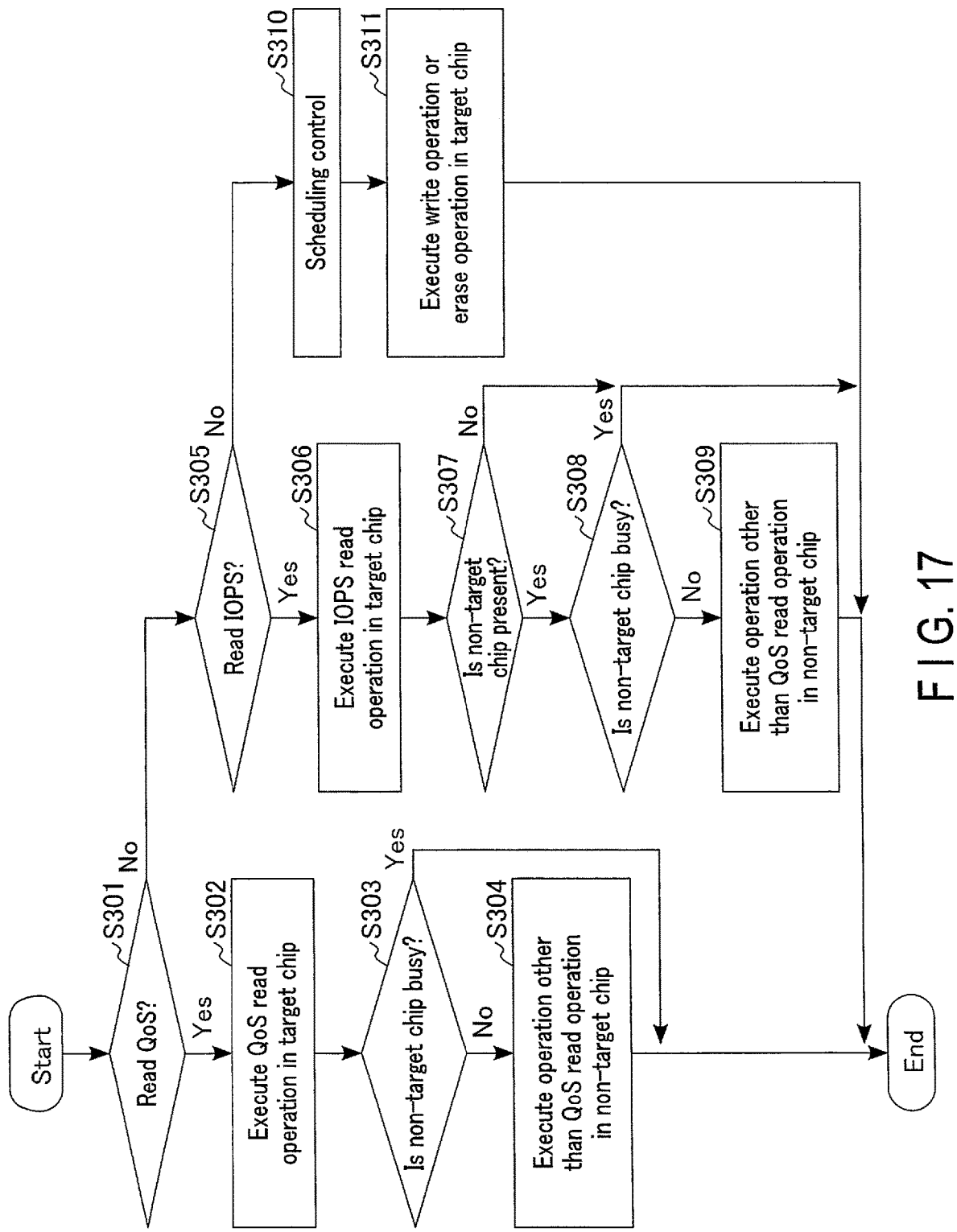
FIG. 17 is a flowchart of priority control in the memory system according to the first embodiment.
Figure 18:
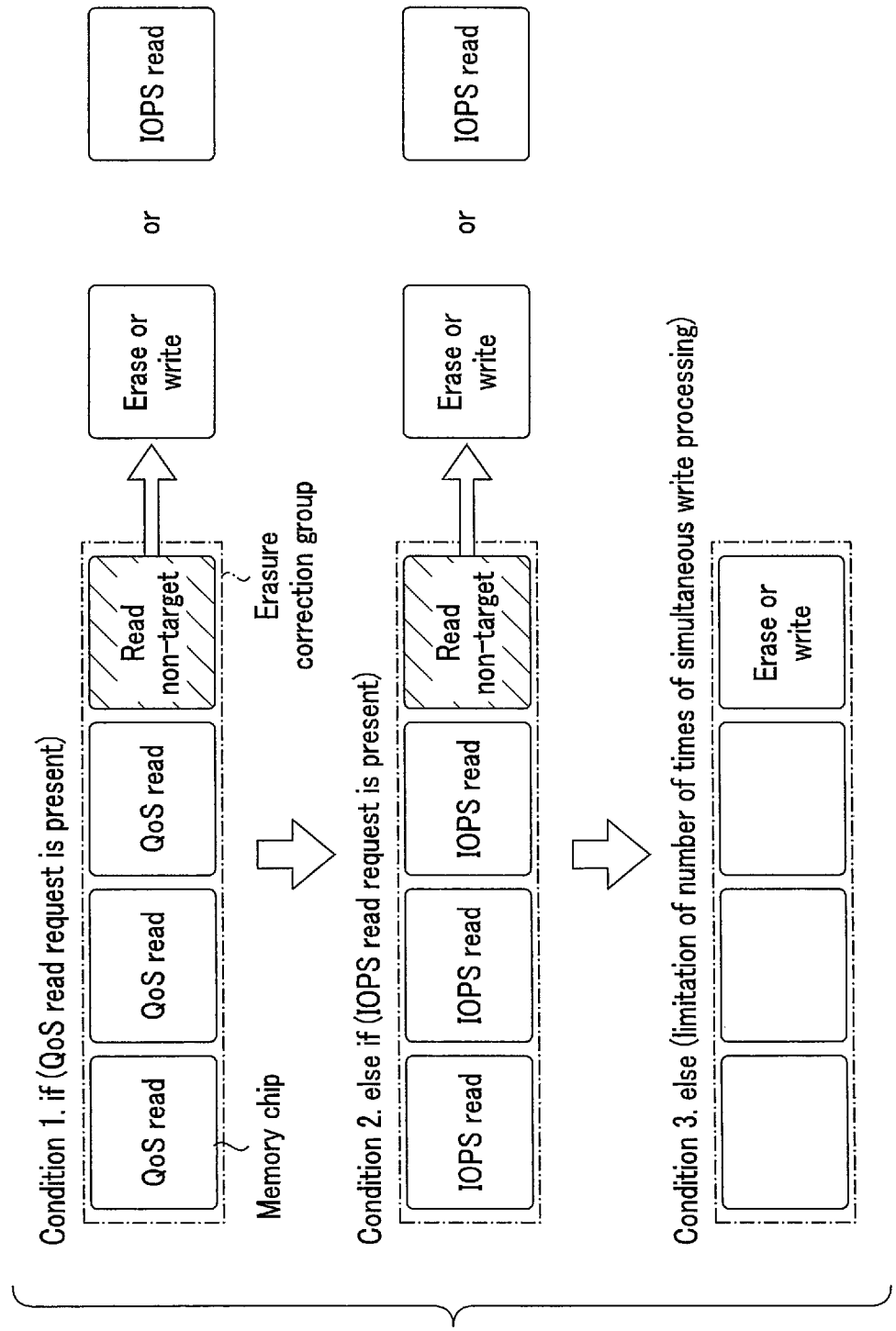
FIG. 18 is a diagram illustrating a specific example of the operations of chips in priority control in the memory system according to the first embodiment.

Next, priority control will be explained with reference to FIGS. 17 and 18. FIG. 17 is a flowchart of priority control. FIG. 18 is a diagram illustrating a specific example of the operations of the chips 20 in the priority control.

As illustrated in FIGS. 17 and 18, when there is a QoS read request (step S301_Yes), that is, in the case of a condition 1 in FIG. 18, the memory system 3 causes a memory chip 20 set as a target of a read operation (hereinafter referred to as a "target chip" as well) to execute the QoS read operation (step S302). In the case of the QoS read operation, among the plurality of memory chips 20 corresponding to the erasure correction group, there is a memory chip 20 not set as a target of the read operation (hereinafter referred to as a "non-target chip"). The example illustrated in FIG. 18 illustrates a case where three of the four memory chips 20 are the target chips 20 and one is the non-target chip 20 in the condition 1.

When the non-target chip 20 is in a busy state (step S303 Yes), the memory system 3 ends the priority control.

On the other hand, when the non-target chip 20 is not in the busy state (step S303_No), the command flow control circuit 150 corresponding to the non-target chip can cause the non-target chip 20 to execute an operation other than the QoS read operation, for example, any one of an IOPS read operation, a write operation, and an erase operation (step S304).

If there is no QoS read request (step S301_No) and there is an IOPS read request (step S305_Yes), that is, in the case of a condition 2 in FIG. 18, the memory system 3 causes the target chip 20 to execute the IOPS read operation (step S306).

In a case where there is no non-target chip 20 in the IOPS read request (step S307_No), the memory system 3 ends the priority control.

On the other hand, in a case where there is a non-target chip 20 in the IOPS read request (Step S307_Yes), the memory system 3 checks whether the non-target chip 20 is in a busy state (step S308). The example illustrated in FIG. 18 illustrates a case where three of the four memory chips 20 are the target chips 20 and one is the non-target chip 20 in the condition 2.

When the non-target chip 20 is in the busy state (step S308_Yes), the memory system 3 ends the priority control.

On the other hand, in a case where the non-target chip 20 is not in the busy state (step S308_No), the command flow control circuit 150 corresponding to the non-target chip 20 can cause the non-target chip 20 to execute an operation other than the QoS read operation, for example, any one of an IOPS read operation corresponding to another IOPS read request, a write operation, and an erase operation (step S309).

In a case where the QoS read request and the IOPS read request are absent (steps S301_No and S305_N), that is, in the case of a condition 3 in FIG. 18, the memory system 3 can execute scheduling control (step S310).

The memory system 3 selects the target chip 20 according to the scheduling control and executes a write operation or an erase operation. The example illustrated in FIG. 18 illustrates a case where the number of times of simultaneous write processing is limited to one in the condition 3.

1.6 Command Sequence of Read Operation

Figure 19:
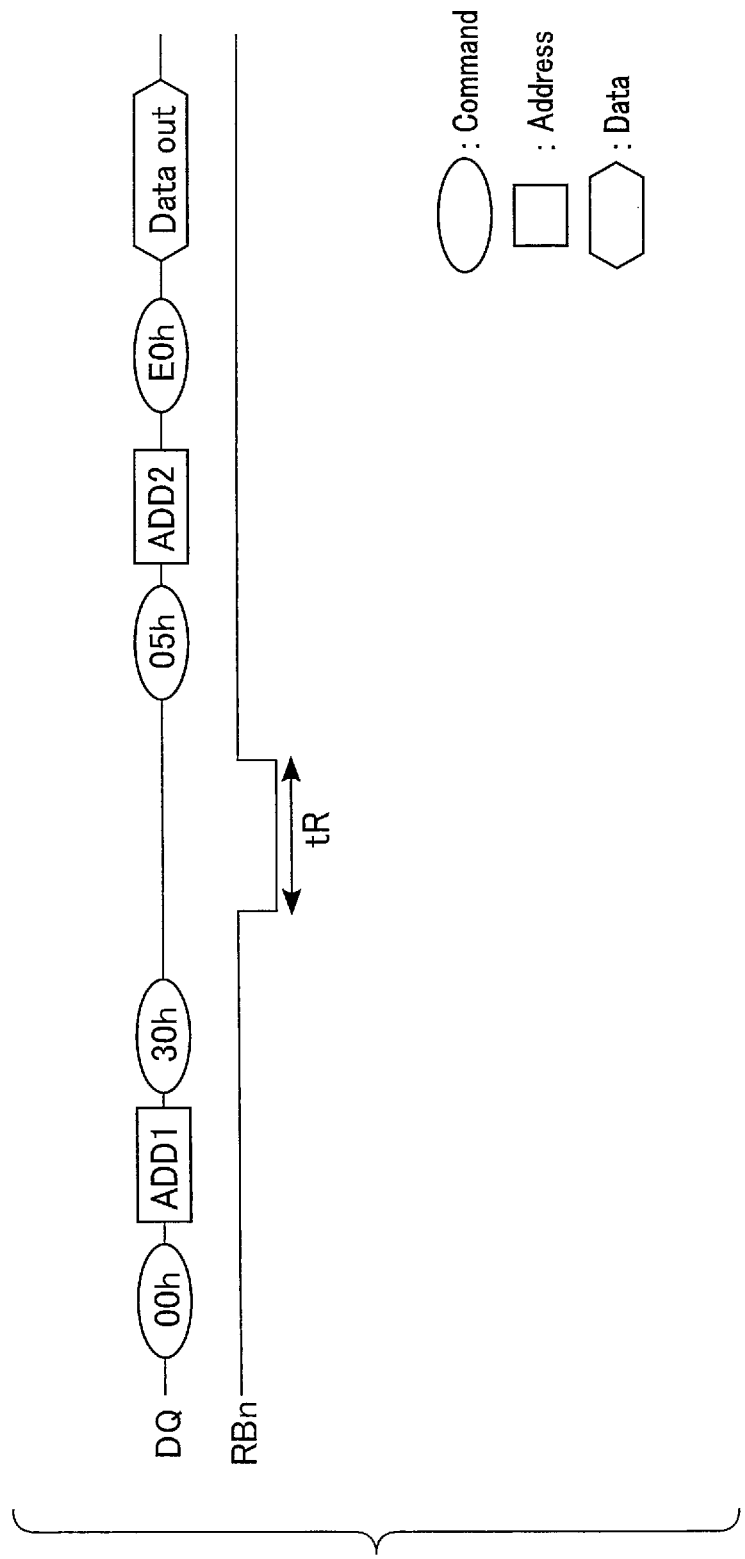
FIG. 19 illustrates a command sequence of a read operation in the memory system according to the first embodiment.

Next, an example of a command sequence of a read operation will be explained with reference to FIG. 19. FIG. 19 illustrates the command sequence of the read operation. In the example illustrated in FIG. 19, in order to simplify explanation, a signal DQ and a ready/busy signal RBn are illustrated. In the signal DQ, a command is written in a round frame, an address is written in a square frame, and data is written in a hexagonal frame.

As illustrated in FIG. 19, the read command control circuit 170 of the memory controller 10 issues a command "00h" and transmits the command "00h" to the memory chip 20. The command "00h" is a command for notifying a cell read operation. The cell read operation is an operation for reading data from the memory cell transistor MC of the memory cell array 211 to the data register 214 in the read operation.

Subsequently, the read command control circuit 170 transmits, for example, an address ADD1 (including a column address CA and a row address RA) corresponding to an address of the memory cell array 211 to the memory chip 20.

Subsequently, the read command control circuit 170 issues a command "30h" and transmits the command to the memory chip 20. The command "30h" is a command for instructing execution of the cell read operation.

When receiving the command "30h" via the command register 204, the sequencer 205 sets the ready/busy signal RBn to the "L" level. Then, the sequencer 205 executes the cell read operation. When read data is stored in, for example, the data register 214, the sequencer 205 sets the ready/busy signal RBn to an "H" level. Hereinafter, a period in which the sequencer 205 sets the ready/busy signal to the "L" level and executes the read operation is referred to as "read period tR".

When receiving the ready/busy signal RBn at the "H" level, the read command control circuit 170 reads read data "Data out" from the data register 214 of the memory chip 20.

More specifically, first, the read command control circuit 170 issues a command "05h" and transmits the command "05h" to the memory chip 20. The command "05h" is a command for notifying a data output operation from the data register 214 to the memory controller 10.

Subsequently, the read command control circuit 170 transmits, for example, an address ADD2 corresponding to the data output start address of the data register 214 to the memory chip 20.

Subsequently, the read command control circuit 170 issues a command "E0h" and transmits the command "E0h" to the memory chip 20. The command "E0h" is a command for instructing execution of the data output operation.

When receiving the command "E0h" via the command register 204, the sequencer 205 transmits the read data "Data out" held in the data register 214 to the memory controller 10 in a state in which the ready/busy signal RBn is held at the "H" level. At this time, a data size of the read data "Data out" can be adjusted according to the clock signals DQS and DQSn.

For example, when determining whether to transmit a read request to the other memory controllers 10 in the QoS read operation, the command flow control circuit 150 of the memory controller 10 may instruct, before the determination, the read command control circuit 170 to perform the read operation to the memory chip 20. In that case, before the read command control circuit 170 transmits the command "05h" to the memory chip 20, the command flow control circuit 150 may determine whether to transmit a read request. In other words, before the read command control circuit 170 instructs the memory chip 20 to perform the data output operation, the command flow control circuit 150 may determine whether to transmit the read request.

1.7 Effects According to Present Embodiment

With the configuration according to the present embodiment, the processing capability of the memory system 3 can be improved.

More specifically, the memory system 3 can divide user data and store the user data in the plurality of memory chips 20 in a distributed manner. Then, the plurality of memory chips 20 can execute the read operation in parallel. Accordingly, the latency of the read operation can be reduced.

In addition, in the case of the IOPS data structure, the memory system 3 can divide the user data into a data size corresponding to a page size and, in the case of the QoS data structure, the memory system 3 can divide the user data into a small size. Accordingly, in the case of the QoS read request, a data size to be read (transmitted) from the memory chip 20 to the memory controller 10 can be set smaller than the page size. Accordingly, the latency of the QoS read request can be reduced.

The memory system 3 can form an erasure correction group for a plurality of divided data having continuous logical addresses and generate an erasure correction code. The memory system 3 can cause the plurality of memory chips 20 to store, in a distributed manner, the plurality of divided data and the erasure correction code in the erasure correction group. In addition, the data of the memory chip 20 in the busy state can be decoded by the erasure correction decoding processing. Accordingly, since the memory chip 20 in the busy state does not have to execute the read operation, an increase in the latency of the read request can be suppressed.

The memory system 3 can control scheduling of the write operation among the plurality of memory controllers 10. The scheduling control can limit the number of times of processing of the write operation or the erase operation to be executed simultaneously. Using the scheduling control, the memory system 3 can limit the number of times of processing of the write operations or the erase operations that can be simultaneously executed to a number equal to or smaller than the number of memory chips 20 that can be simultaneously decoded by the erasure correction decoding processing. Accordingly, the memory system 3 can execute the QoS read operation even during the write operation or the erase operation. Therefore, an increase in the latency of the QoS read request can be suppressed.

The memory system 3 can preferentially execute the QoS read request according to the priority control. Accordingly, an increase in the latency for the QoS read request can be suppressed.

In addition, the memory system 3 can simultaneously execute the QoS read operation and the IOPS read operation. In addition, the IOPS read operations can be executed in parallel in the plurality of memory chips 20. As a result, the latency of the IOPS read request can be reduced. Accordingly, the processing capability of the memory system 3 can be improved.

2. Second Embodiment

Next, a second embodiment will be explained. In the second embodiment, four examples are explained about a QoS data structure and an IOPS data structure different from those in the first embodiment. Hereinafter, differences from the first embodiment will be mainly explained.

2.1 First Example

First, a first example will be explained with reference to FIG. 20. In the first example, a case where IOPS page data includes an erasure correction code will be explained. FIG. 20 is a diagram illustrating a flow of generation of IOPS page data in an LOPS write request.

As illustrated in FIG. 20, the data encoding circuit (the memory system 3) divides the user data D into 4 KB four data $D_0$ to $D_3$ as in FIG. 7 in the first embodiment.

Next, the data encoding circuit 40 generates an erasure correction group including a plurality of divided data having continuous logical addresses. In the example illustrated in FIG. 20, three divided data $D_0$ to $D_2$ are included in one erasure correction group.

Subsequently, the data encoding circuit 40 generates an erasure correction code. For example, the data encoding circuit 40 executes exclusive OR operation (XOR) using bits of the divided data $D_0$ to $D_2$ to generate the erasure correction code $P_{012}$.

Subsequently, the data encoding circuit 40 generates an error correction code for each of the divided data Do to $D_2$ and the erasure correction code $P_{012}$. For example, a low density parity check (LDPC) code can be used as the error correction code.

Error correction codes are respectively added to the divided data $D_0$ to $D_2$ and the erasure correction code $P_{012}$ and data frames having a page size are generated. The data frames are written in the memory chips 20 in a distributed manner. In the example illustrated in FIG. 20, the memory controller 10_0 writes IOPS page data including the divided data $D_0$ and the error correction code of the divided data $D_0$ in the memory chip 20_0. The memory controller 10_1 writes IOPS page data including the divided data $D_1$ and the error correction code of the divided data $D_1$ in the memory chip 20_1. The memory controller 10_2 writes IOPS page data including the divided data $D_2$ and the error correction code of the divided data $D_2$ in the memory chip 20_2. The memory controller 103 writes IOPS page data including the erasure correction code $P_{012}$ and the error correction code of the erasure correction code $P_{012}$ in the memory chip 20_3.

Next, an IOPS read request will be explained. In an IOPS read request for reading the divided data $D_0$ to $D_2$, when the memory chips 20_0 to 20_2 are in the ready state, the memory controller 10_0 to 10_2 reads one-page data from the data register 214 of the own chip 20. The divided data $D_0$ to $D_2$ are output to the host device 2 as read data after the ECC processing.

In addition, when any one of the memory chips 20_0 to 20_2 is in the busy state, the memory controller 10 in which the own chip 20 is in the busy state transmits a read request for other data belonging to the erasure correction group to the other memory controllers 10. The other memory controllers 10 read the one-page data from the data register 214 of the own chip 20. The memory controller 10 in which the own chip 20 is in the busy state executes the erasure correction decoding processing based on data of the other chips 20. The divided data Do to $D_2$ including the decoded data are output to the host device 2 as read data.

2.2 Second Example

Next, a second example will be explained with reference to FIGS. 21 and 22. In the second example, a case where IOPS page data is configured by a plurality of small-size data frames like the QoS page data will be explained. FIG. 21 is a diagram illustrating an IOPS data structure in a case where the IOPS page data does not include an erasure correction code. FIG. 22 is a diagram illustrating an IOPS data structure in a case where the IOPS page data includes an erasure correction code.

As illustrated in FIG. 21, for example, the data encoding circuit 40 may divide user data into small size units when generating the IOPS page data. In the example illustrated in FIG. 21, the user data D is divided into sixteen divided data $D_0$ to $D_{15}$ in small size units. An error correction code is added to each of the divided data $D_0$ to $D_{15}$. Then, the IOPS page data includes a plurality of divided data (small-size data frames). In the case of the IOPS data structure, unlike the QoS data structure, a plurality of divided data included in a page has continuous logical addresses.

For example, IOPS page data including the divided data $D_0$ to $D_3$ having continuous logical addresses is written in the memory chip 20_0. IOPS page data including the divided data $D_4$ to $D_7$ having continuous logical addresses is written in the memory chip 20_1. LOPS page data including the divided data $D_8$ to $D_{11}$ having continuous logical addresses is written in the memory chip 20_2. LOPS page data including the divided data $D_{12}$ to $D_{15}$ having continuous logical addresses is written in the memory chip 20_3.

As illustrated in FIG. 22, for example, similarly, in a case where the IOPS page data includes an erasure correction code, a plurality of divided data (small-size data frames) may be included in the IOPS page data. In the example illustrated in FIG. 22, the user data D is divided into twelve divided data $D_0$ to $D_{11}$ in small size units. Then, an error correction code is added to each of the divided data $D_0$ to $D_{11}$. For example, the erasure correction group 1 includes the divided data $D_0$, $D_4$, and $D_8$ and the erasure correction code $P_{048}$ of the divided data. The erasure correction group 2 includes the divided data $D_1$, $D_5$, and $D_9$ and the erasure correction code $P_{159}$ of the divided data. The erasure correction group 3 includes the divided data $D_2$, $D_6$, and $D_{10}$ and the erasure correction code $P_{2610}$ of the divided data. The erasure correction group 4 includes the divided data $D_3$, $D_7$, and $D_{11}$ and the erasure correction code $P_{3711}$ of the divided data.

Similarly to the QoS data structure, a continuous plurality of erasure correction groups are written in a distributed manner in the plurality of memory chips 20. For example, the memory controller 10_0 collectively writes IOPS page data including a data frame including the divided data $D_0$ of the erasure correction group 1, a data frame including the divided data $D_1$ of the erasure correction group 2, a data frame including the divided data $D_2$ of the erasure correction group 3, and a data frame including the divided data $D_3$ of the erasure correction group 4 in the IOPS data area 211*b* of the memory chip 20_0. The memory controller 10_1 collectively writes IOPS page data including a data frame including the divided data $D_4$ of the erasure correction group 1, a data frame including the divided data $D_5$ of the erasure correction group 2, a data frame including the divided data $D_6$ of the erasure correction group 3, and a data frame including the divided data $D_7$ of the erasure correction group 4 in the IOPS data area 211*b* of the memory chip 20_1. The memory controller 10_2 collectively writes IOPS page data including a data frame including the divided data $D_8$ of the erasure correction group 1, a data frame including the divided data. $D_9$ of the erasure correction group 2, a data frame including the divided data $D_{10}$ of the erasure correction group 3, and a data frame including the divided data $D_{11}$ of the erasure correction group 4 in the IOPS data area 211*b* of the memory chip 20_2. The memory controller 10_3 collectively writes IOPS page data including a data frame including the erasure correction code $P_{048}$ of the erasure correction group 1, a data frame including the erasure correction code $P_{159}$ of the erasure correction group 2, a data frame including the erasure correction code $P_{2610}$ of the erasure correction group 3, and a data frame including the erasure correction code $P_{3711}$ of the erasure correction group 4 in the IOPS data area 211*b* of the memory chip 3.

By configuring the IOPS data as a small-size data frame, the memory chip 20 can output the small-size data frame in the IOPS read request.

2.3 Third Example

Next, a third example will be explained with reference to FIG. 23. In the third example, a case where data (small-size data frames) are arranged in rotation for each of erasure correction groups in the QoS data structure will be explained. FIG. 23 is a diagram illustrating a QoS data structure. Note that, in the example illustrated in FIG. 23, an error correction code is omitted in order to simplify the explanation.

As illustrated in FIG. 23, in a continuous plurality of erasure correction groups, the order of small-size frame data arranged in the memory chips 20 may be rotated for each of the groups. As a result, for example, n continuous divided data are distributed to the n memory chips 20. In addition, for example, frame data including an erasure correction code is distributed to the plurality of memory chips 20. In the example illustrated in FIG. 23, the memory controller 10_0 collectively writes, in the QoS data area 211*a* of the memory chip 20_0, QoS page data including a data frame including the divided data $D_0$ of the erasure correction group 1, a data frame including the divided data $D_4$ of the erasure correction group 2, a data frame including the divided data $D_8$ of the erasure correction group 3, and a data frame including the erasure correction code $P_{91011}$ of the erasure correction group 4. The memory controller 10_1 collectively writes, in the QoS data area 211*a* of the memory chip 20_1, the QoS page data including a data frame including the divided data $D_1$ of the erasure correction group 1, a data frame including the divided data $D_5$ of the erasure correction group 2, a data frame including the erasure correction code $P_{678}$ of the erasure correction group 3, and a data frame including the divided data $D_9$ of the erasure correction group 4. The memory controller 10_2 collectively writes, in the QoS data area 211*a* of the memory chip 202, the QoS page data including a data frame including the divided data $D_2$ of the erasure correction group 1, a data frame including the erasure correction code $P_{345}$ of the erasure correction group 2, a data frame including the divided data $D_6$ of the erasure correction group 3, and a data frame including the divided data $D_{10}$ of the erasure correction group 4. The memory controller 10_3 collectively writes, in the QoS data area 211a of the memory chip 20_3, QoS page data including a data frame including the erasure correction code $P_{012}$ of the erasure correction group 1, a data frame including the divided data $D_3$ of the erasure correction group 2, a data frame including the divided data $D_7$ of the erasure correction group 3, and a data frame including the divided data $D_{11}$ of the erasure correction group 4.

Accordingly, for example, the divided data $D_0$ to $D_3$ having continuous logical addresses are arranged in the memory chips 20_0 to 20_3 in a distributed manner.

Similarly, the divided data $D_4$ to $D_7$ are arranged in the memory chips 20_0 to 20_3 in a distributed manner. The divided data $D_5$ to $D_{11}$ are arranged in the memory chips 20_0 to 20_3 in a distributed manner. Then, the erasure correction codes $P_{012}$, $P_{345}$, $P_{679}$, and $P_{91011}$ are arranged in the memory chips 20_3, 20_2, 20_1, and 20_0 in a distributed manner.

For example, in a case where the divided data $D_0$ to $D_3$ are read from the memory chips 20_0 to 20_3, the divided data $D_0$ to $D_3$ are distributed in the memory chips 20_0 to 20_3. When there is no memory chip 20 in the busy state, the memory system 3 reads one divided data from the memory chips 20. Therefore, average latency at a read operation time in a case where there is no memory chip 20 in the busy state is guaranteed. In addition, when any of the memory chips 20 is in the busy state, the memory system 3 reads three divided data from the remaining three memory chips 20. Then, the memory system 3 decodes one divided data through erasure correction decoding processing. Therefore, the number of data to be decoded by the erasure correction decoding processing can be fixed.

2.4 Fourth Example

Next, a fourth example is explained with reference to FIGS. 24 and 25. The fourth example will be explained focusing on an error correction code. FIG. 24 is a diagram illustrating an example in which an error correction code of the same scheme is added to the divided data of the QoS data structure and the IOPS data structure. FIG. 25 is a diagram illustrating an example in which error correction codes of different schemes are added to the divided data of the QoS data structure and the IOPS data structure.

As illustrated in FIG. 24, for example, a BCH code may be applied as the error correction code in the QoS data structure and the IOPS data structure. That is, the error correction code of the same scheme may be added to small-size divided data and relatively large divided data corresponding to a page size. Note that the error correction code is not limited to the BCH code. For example, the error correction code may be an LDPC code.

As illustrated in FIG. 25, for example, the BCH code may be applied as the error correction code in the QoS data structure and the LDPC code may be applied as the error correction code in the IOPS data structure. That is, error correction codes of different schemes may be added to the small-size divided data and the relatively large divided data corresponding to the page size. More specifically, for example, a relatively small block code such as the BCH code and a low-latency processable error correction code are suitable for the small-size divided data. Furthermore, for example, a large block code (for example, the LDPC code) having a higher correction capability and a higher coding rate compared with the BCH code is easily applied to the relatively large divided data corresponding to the page size. Note that the error correction code is not limited to the BCH code and the LDPC code.

2.5 Effects According to Present Embodiment

The data configuration according to the present embodiment can be applied to the first embodiment.

Further, according to the first example of the present embodiment, the memory system 3 can include the erasure correction code in the IOPS page data. Accordingly, even if the memory chip 20 in the busy state is generated in the IOPS read request, data can be decoded. Therefore, the latency of the IOSP read request can be reduced.

Further, according to the second example of the present embodiment, the memory system 3 can configure IOPS page data into a plurality of small-size data frames. Accordingly, similarly to the QoS read request, a data size to be read (transmitted) from the memory chip to the memory controller 10 can be set smaller than the page size. Accordingly, the latency of the IOPS read request can be reduced with respect to the read request having the data size smaller than the page size. Further, the size of the divided data can be set the same in the QoS data structure and the IOPS data structure. This facilitates data management in the memory system 3.

Further, according to the third example of the present embodiment, the memory system 3 may rotate the arrangement of small-size data frames arranged in a plurality of memory chips for each of the erasure correction groups in the QoS data structure. Accordingly, for example, in a case where there is no memory chip 20 in the busy state, an amount of data read from the memory chips 20 can be fixed. Accordingly, the latency of the QoS read operation can be fixed.

Further, according to the fourth example of the present embodiment, an error correction code of an optimum scheme can be added to each of the divided data. Accordingly, the error correction capability of the divided data can be improved.

Note that the first to fourth examples can be combined as much as possible.

3. Third Embodiment

Next, a third embodiment will be explained. In the third embodiment, priority control different from that in the first embodiment will be explained. Hereinafter, differences from the first and second embodiments will be mainly explained.

3.1 Priority Control

The priority control is explained with reference to FIG. 26. FIG. 26 is a diagram illustrating a specific example of the operations of chips 20 in the priority control.

As illustrated in FIG. 26, a difference from the first embodiment is that a condition 0 is added to the priority control explained with reference to FIG. 18. For example, in a case where the number of write requests stored in write request FIFO 110 is larger than a preset threshold, a memory controller 10 prioritizes the write requests over the QoS read request as indicated by the condition 0. In this case, command flow control circuits 150 of the plurality of memory controllers 10 can simultaneously execute a plurality of write operations (or erase operations) without performing scheduling control. Note that the memory controller 10 in which the number of the write requests stored in the write request FIFO 110 is equal to or smaller than the threshold may cause the memory chips 20 to execute, for example, the IOPS read operation during this period.

The processing of the condition 1 and the subsequent conditions is the same as the processing illustrated in FIG. 18 in the first embodiment.

3.3 Effects According to Present Embodiment

With the configuration according to the present embodiment, the same effects as the effects of the first embodiment can be obtained.

4. Fourth Embodiment

Next, a fourth embodiment will be explained. In the fourth embodiment, a flow of operation selection of a command flow control circuit 150 is explained.

Hereinafter, differences from the first to third embodiments will be mainly explained.

4.1 Flow of Operation Selection of Command Flow Control Circuit Responding to Read Request First, a flow of control of the command flow control circuit 150 responding to a read request is explained with reference to FIG. 27. FIG. 27 is a flowchart illustrating a flow of operation selection in the command flow control circuit 150. Note that, in the present embodiment, the case of the QoS read request is explained. However, the present invention can also be applied to the LOPS read request.

As illustrated in FIG. 27, the command flow control circuit 150 receives a QoS read request from the QoS read request FIFO 120 (step S401).

The command flow control circuit 150 receives a congestion degree determination result from the congestion degree determination circuit 140. When a congestion degree of the own chip 20 is higher than a congestion degree of the other chips 20 (step S402_Yes), the command flow control circuit 150 transmits a read request to the other memory controllers 10 corresponding to the other chips 20 belonging to the same erasure correction group to which data to be read belongs (step S403). When receiving data of the other chips 20, the correction decoding circuit 180 performs erasure correction decoding processing.

When the congestion degree of the own chip 20 is equal to or lower than the congestion degree of the other chips 20 (step S402_No), the command flow control circuit 150 acquires write control information from the write command control circuit 160 and checks whether the own chip 20 is executing a write operation (or an erase operation) (step S404).

When the own chip 20 is not executing the write operation (or the erase operation) (step S404_No), the command flow control circuit 150 transmits a read request to the read command control circuit 170 (step S405). The read command control circuit 170 causes the memory chips to execute a read operation.

When the own chip 20 is executing the write operation (or the erase operation) (step S404_Yes), the command flow control circuit 150 checks write control information and compares a time (a period) until the write operation is scheduled to be ended and a preset threshold time (period) (step S406).

When the scheduled end time is longer than the threshold (step S406 Yes), the command flow control circuit 150 requests the write command control circuit 160 to suspend the write operation (step S407). The write command control circuit 160 transmits a suspend command to the memory chips 20. When receiving the suspend command, the memory chips 20 suspend the write operation. When checking that the write operation is suspended, the command flow control circuit 150 proceeds to step S405 and transmits a read request to the read command control circuit 170. For example, when the read operation ends in the memory chips 20, the read command control circuit transmits a resume command to the memory chips 20. When receiving the resume command, the memory chips 20 resume the write operation.

When the scheduled end time is equal to or smaller than the threshold (step S406_No), the command flow control circuit 150 stays on standby until the memory chips 20 come into a ready state (step S408). When the memory chips 20 come into the ready state, the command flow control circuit 150 proceeds to step S405 and transmits a read request to the read command control circuit 170. Note that the command flow control circuit 150 may transmit the read request to the read command control circuit 170 before the memory chips 20 come into the ready state. In this case, after the memory chips 20 come into the ready state, the read command control circuit 170 instructs the memory chips 20 to execute the read operation (transmits a command sequence to the memory chips 20).

4.2 Transmission and Reception of Information and the Like in Read Request

Figure 28:
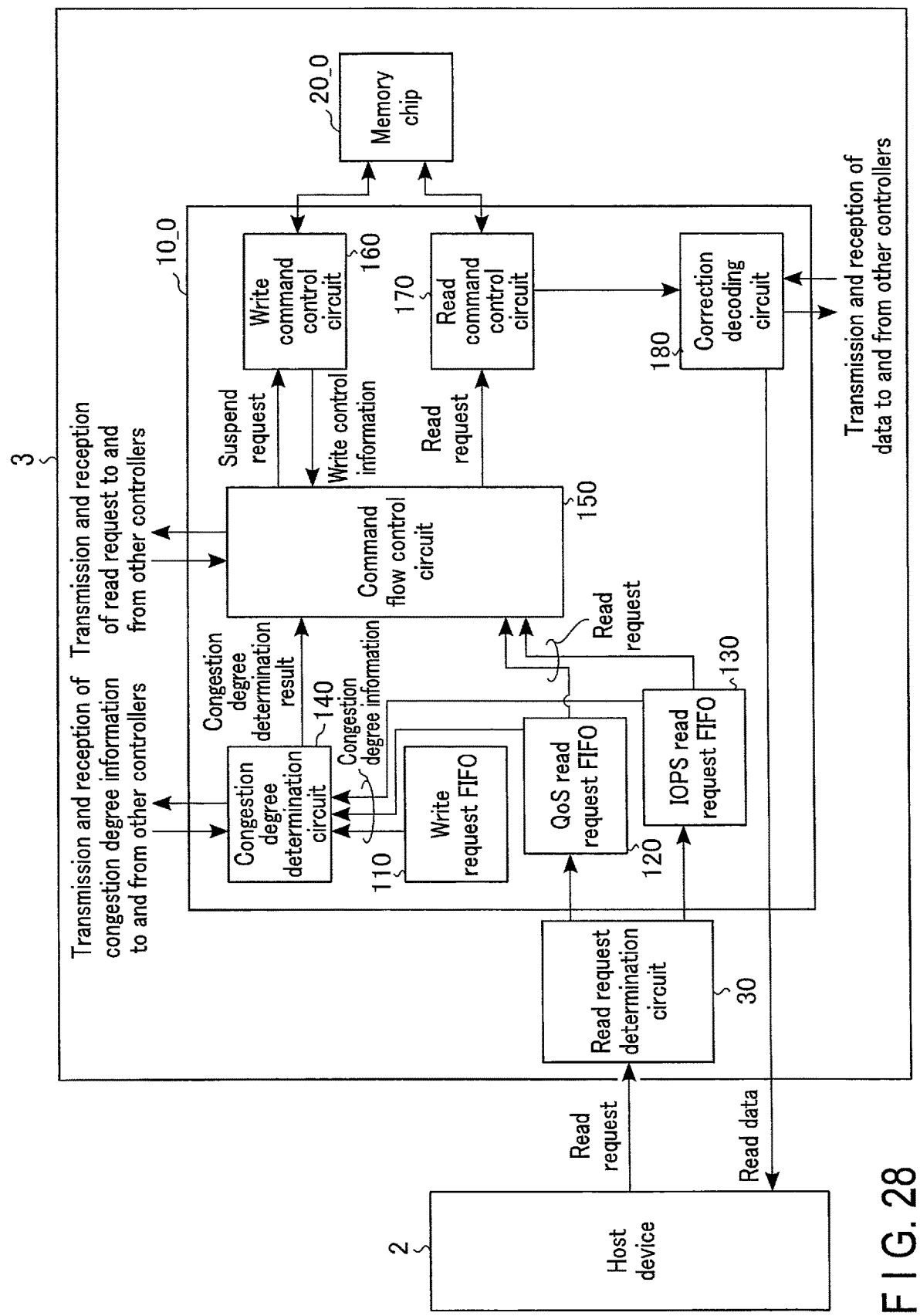
FIG. 28 is a diagram illustrating transmission and reception of information and the like in a read request in the memory system according to the fourth embodiment.

Next, an example of transmission and reception of information and the like in a read request will be explained with reference to FIG. 28. FIG. 28 is a diagram illustrating the transmission and reception of information and the like in the read request. In order to simplify the explanation, the example illustrated in FIG. 28 illustrates a case where the read request is transmitted to the memory controller 10_0 and the other memory controllers 10_1 to 10_3 are omitted.

As illustrated in FIG. 28, the read request is transmitted from the host device 2 to the memory system 3. When the read request is a request for a QoS read operation, the read request determination circuit 30 of the memory system 3 transmits the read request to the QoS read request FIFO 120 of the memory controller 10_0. In addition, when the read request is a request for an IOPS read operation, the read request determination circuit 30 transmits the read request to the LOPS read request FIFO 130 of the memory controller 10_0. The QoS read request FIFO 120 or the IOPS read request FIFO 130 transmits read requests to the command flow control circuit 150 in order in which the read requests are input.

The congestion degree determination circuit 140 receives congestion degree information from the write request FIFO 110, the QoS read request FIFO 120, and the IOPS read request FIFO 130. In addition, the congestion degree determination circuit 140 receives congestion degree information of the other memory controllers 10. The congestion degree determination circuit 140 determines a congestion degree from the received congestion degree information of the memory controllers 10. The congestion degree determination circuit 140 transmits a congestion degree determination result to command flow control circuit 150.

The command flow control circuit 150 receives a read request from the QoS read request FIFO 120, the IOPS read request FIFO 130, or the command flow control circuits 150 of the other memory controllers 10. When the write operation is executed in the memory chip 20_0, the command flow control circuit 150 receives the write control information from the write command control circuit 160.

When suspending the write operation of the own chip the command flow control circuit 150 transmits a suspend request to the write command control circuit 160. When causing the own chip 20 to execute the read operation, the command flow control circuit 150 transmits a read request to the read command control circuit 170. In addition, when the read operation is not executed in the own chip 20, the command flow control circuit 150 transmits a read request to the other memory controllers 10.

Transmission and reception of other information and the like are similar to the transmission and reception explained with reference to FIG. 16 of the first embodiment.

4.3 Effects According to Present Embodiment

With the configuration according to the present embodiment, the same effects as the effects of the first embodiment can be obtained.

In addition, with the configuration according to the present embodiment, the command flow control circuit 150 can switch control according to a congestion state of the other chips 20 and an operation state of the own chip 20. Accordingly, the memory system 3 can dynamically select an optimum operation. Accordingly, the processing capability of the memory system 3 is improved.

5. Fifth Embodiment

Next, a fifth embodiment will be explained. In the fifth embodiment, a case where memory chips 20 are capable of executing a plurality of read operations will be explained.

5.1 Read Operation

The read operation of the present embodiment includes a normal read operation and a highly reliable read operation. The normal read operation is an operation for reading data of the memory cell transistors MC based on preset read voltages in states. The highly reliable read operation is an operation for reading data a plurality of times while changing a read voltage for one state in order to reduce fail bits. In the highly reliable read operation, the read period tR tends to be longer than the read time tR in the normal read operation, that is, latency tends to be longer.

For example, when the degree of exhaustion (hereinafter referred to as "cell exhaustion degree") of the memory cell transistor MC increases, the threshold voltage of the memory cell transistor MC tends to fluctuate easily. That is, a fail bit easily occurs. In such a case, the fail bit can be reduced by executing the highly reliable read operation. Note that the cell exhaustion degree is calculated based on the number of times of rewrite, the number of times of read of data in the memory cell transistor MC or the like taking into account cell characteristics or the like of the memory cell transistor MC.

The read command control circuit 170 can select the normal read operation or the highly reliable read operation by issuing different read commands. For example, the read command control circuit 170 selects the read operation based on the read request and the cell exhaustion degree. More specifically, the read command control circuit 170 compares the cell exhaustion degree with a preset threshold. Then, the read command control circuit 170 selects the read operation based on a comparison result. At this time, since the IOPS read request and the QoS read request have different required latencies, different thresholds are set. Hereinafter, the threshold corresponding to the IOPS read request is referred to as "IOPS threshold". The threshold corresponding to the QoS read request is referred to as "QoS threshold".

5.2 Selection of Read Operation in Read Command Control Circuit

Next, selection of the read operation in the read command control circuit 170 will be explained with reference to FIG. 29. FIG. 29 is a flowchart of a selection operation in the read command control circuit 170.

As illustrated in FIG. 29, the read command control circuit 170 receives a read request from the command flow control circuit 150 (step S501).

When the read request is an IOPS read request (step S502 Yes), the read command control circuit 170 compares the cell exhaustion degree and the IOPS threshold (step S503).

On the other hand, when the read request is a QoS read request (step S502_No), the read command control circuit 170 compares the cell exhaustion degree with the QoS threshold (step S504).

When the cell exhaustion degree is equal to or smaller than the IOPS threshold (step S503_No) or when the cell exhaustion degree is equal to or smaller than the QoS threshold (step S504_No), the read command control circuit 170 selects the normal read operation (step S505).

On the other hand, when the cell exhaustion degree is greater than the IOPS threshold (step S503_Yes) or when the cell exhaustion degree is greater than the QoS threshold (step S504_Yes), the read command control circuit 170 selects the highly reliable read operation (step S506).

5.3 Effects According to Present Embodiment

With the configuration according to the present embodiment, the same effects as the effects of the first embodiment can be obtained.

Furthermore, with the configuration according to the present embodiment, the read operation can be selected according to the cell exhaustion degree. Accordingly, occurrence of fail bits in the memory cell transistor MC having a large cell exhaustion degree can be suppressed and the reliability of data can be improved. In addition, with the configuration according to the present embodiment, different thresholds can be set for the IOPS read request and the QoS read request. Accordingly, the reliability of data can be improved in a state in which the latency of the read request is considered.

6. Modifications and the Like

According to the above embodiment, a memory system (3) includes: a plurality of memory chips (20) respectively including a plurality of first memory cells (MC) in which data is collectively written; a plurality of memory controllers (10) respectively connected to the memory chips; and a data encoding circuit (40) configured to divide user data into a first data size (small size) smaller than a page size for collectively writing the user data into the first memory cells, two or more of the first data sizes being included in the page size, form a first group (erasure correction group) including a continuous plurality of first divided data among the user data divided into the first data size, and generate a plurality of first page data (QoS page data) in which the first divided data are distributed on the memory chips. The memory controllers are configured to adjust a schedule of a write operation among the memory controllers, control a number of the write operations to be simultaneously executed, and write the plurality of first page data in the memory chips. When at least one of the memory chips is in a busy state in a first read request for the plurality of first divided data, the memory controller connected to the memory chip in the busy state decodes the first divided data stored in the memory chip in the busy state through erasure correction decoding processing using the first divided data read from the memory chip not in the busy state.

By applying the embodiments explained above, it is possible to provide a memory system that can improve a processing capability.

Note that the embodiments are not limited to the forms explained above and various modifications are possible.

For example, the embodiments can be combined as much as possible.

In the embodiments, the host device 2 may determine the QoS read request and the IOPS read request or the memory system 3 may determine the QoS read request and the IOPS read request.

For example, in the embodiments, the error correction code may be determined considering the endurance of the memory chips 20.

For example, in the embodiments, the data encoding circuit 40 may switch the write data to be generated from the QoS data structure to the IOPS data structure considering the congestion degree of the write operation.

For example, in the embodiments, when a plurality of memory chips 20 are connected to the memory controller the memory chip 20 corresponding to the IOPS data structure and the memory chip 20 corresponding to the QoS data structure may be separated.

For example, in the embodiments, the case where the plurality of memory controllers 10 respectively control the memory chips 20 is explained. However, the present invention is not limited to this. For example, one memory controller 10 may have a plurality of channels and the memory chips 20 connected to the channels may be independently controlled by the memory controller 10.

Furthermore, the "connection" in the above embodiment also includes a state of indirect connection with intervention of some other thing such as a transistor or a resistor.

While several embodiments have been described, these embodiments have been presented by way of example and are not intended to limit the scope of the invention. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

The invention claimed is:

1. A memory system comprising:
a plurality of memory chips respectively including a plurality of first memory cells in which first page data is collectively written and a plurality of second memory cells in which second page data is collectively written;
a plurality of memory controllers respectively connected to the memory chips; and
a data encoding circuit configured to:
divide user data into a plurality of first divided data or a plurality of second divided data, the plurality of first divided data respectively having a first data size smaller than a page size for collectively writing data into one of the memory chips, two or more of the first data sizes being included in the page size, the plurality of second divided data respectively having a second data size corresponding to the page size and larger than the first data size;
form a first group including a plurality of third divided data, the plurality of third divided data being included in the plurality of first divided data and having continuous logical addresses;
generate a plurality of first page data in which the plurality of third divided data are distributed on the memory chips; and
generate a plurality of second page data in which the plurality of second divided data are distributed on the memory chips;
wherein
the memory controllers are configured to adjust a schedule of a write operation among the memory controllers, control a number of the write operations to be simultaneously executed, and write the plurality of first page data in the memory chips, and
when at least one of the memory chips is in a busy state in a first read request for the plurality of third divided data, the memory controller connected to the memory chip in the busy state is configured to decode the third divided data stored in the memory chip in the busy state through erasure correction decoding processing using the third divided data read from the memory chip not in the busy state.

2. The memory system according to claim 1, wherein the first read request for the plurality of third divided data is prioritized over a second read request for plurality of the second divided data.

3. The memory system according to claim 2, wherein the second read request for the plurality of second divided data is prioritized over a write request.

4. The memory system according to claim 2, wherein in the first read request for the plurality of third divided data, a memory chip not executing a read operation of the plurality of third divided data executes the read operation of the plurality of second divided data or the write operation.

5. The memory system according to claim 2, wherein when a number of write requests is larger than a preset number; the write request is prioritized over the first read request for the plurality of third divided data, and the memory controllers are configured to execute the write operations without adjusting the schedule of the write operations among the memory controllers.

6. The memory system according to claim 1, wherein an error correction code added to each of the plurality of third divided data and an error correction code added to each of the plurality of second divided data have different schemes.

7. The memory system according to claim 1, wherein an error correction code added to each of the plurality of third divided data and an error correction code added to each of the plurality of second divided data have a same scheme.

8. The memory system according to claim 1, wherein the data encoding circuit is configured to generate a plurality of third page data, each of the plurality of third page data including a plurality of fourth divided data included in the plurality of first divided data and having continuous logical addresses, and
each of the memory chips stores one of the plurality of first page data and one of the plurality of third page data.

9. The memory system according to claim 1, wherein the data encoding circuit is configured to form a second group including a plurality of fifth divided data included in the plurality of first divided data and having, continuous logical addresses, and
one of the plurality of first page data includes one of the plurality of third divided data and one of the plurality of plurality fifth divided data, and a logical address of the one of the plurality of third divided data and a logical address of the one of the plurality of fifth divided data are not continuous.

10. The memory system according to claim 1, wherein
the memory chips respectively include a plurality of second memory cells in which data is collectively written,
the first memory cells correspond to the plurality of first page data and the second memory cells correspond to the plurality of second page data, and
each of the first memory cells is capable of holding one-bit or larger data and each of the second memory cells is capable of holding data with a larger number of bits than each of the first memory cells.

11. The memory system according to claim 1, wherein
the first memory cells are capable of storing one of the plurality of first page data and one of the plurality of second page data, and
a number of read levels for determining the one of the plurality of first page data is smaller than a number of read levels for determining the one of plurality of the second page data.

12. The memory system according to claim 1, wherein
in the first read request for the plurality of third divided data, in a case where the memory chip in the busy state is executing the write operation and a period until a scheduled end of the write operation is longer than a preset period, the memory controller connected to the memory chip in the busy state suspends the write operation and executes a read operation of the plurality of third divided data.

13. The memory system according to claim 1, wherein
in the first read request tor the plurality of third divided data, in a case where the memory chip in the busy state is executing the write operation and a period until a scheduled end of the write operation is equal to or shorter than a preset period, the memory controller connected to the memory chip in the busy state stays on standby until the memory chip in the busy state comes into a ready state and executes a read operation of the third divided data.

14. The memory system according to claim 1, wherein
a read operation includes a first read operation and a second read operation having longer latency than the first read operation,
in the first read request for the plurality of third divided data, each of the controllers selects the first read operation in a case where an exhaustion degree of the first memory cells corresponding thereto is equal to or smaller than a preset first threshold and selects the second read operation in a case where the exhaustion degree is larger than the first threshold, and
in a second read request for the plurality of second divided data, each of the controllers selects the first read operation when the exhaustion degree of the corresponding plurality of first memory cells is equal to or smaller than a preset second threshold and selects the second read operation when the exhaustion degree is larger than the second threshold.

15. The memory system according to claim 1, wherein each of the memory controllers includes a determination circuit configured to acquire congestion degree information of the memory chips and determine a congestion degree of a memory chip corresponding thereto.

16. The memory system according to claim 1, wherein a number of divided data capable of encoding by the erasure correction decoding processing and a number of the write operations to be simultaneously executed are same.

17. The memory system according to claim 1, wherein
the first group further includes an erasure correction code based on the plurality of third divided data,
the erasure correction code is stored in a first memory chip that is one of the memory chips and the plurality of third divided data are stored in at least one of the memory chips other than the first memory chip, and
when at least one of the memory chips storing the plurality of third divided data is in a busy state in the first read request for the plurality of third divided data, the memory controller connected to the memory chip in the busy state is configured to decode the third divided data stored in the memory chip in the busy state through erasure correction decoding processing using the third divided data and the erasure correction code read from the memory chips not in the busy state.

18. The memory system according to claim 1, wherein
a third data size read from one of the memory chips corresponding to the first read request for the plurality of the third divided data is different from a fourth data size read from one of the memory chips corresponding to a second read request for the plurality of the second divided data.

19. The memory system according to claim 18, wherein the third data size is smaller than the fourth data size.

* * * * *